(12) United States Patent
Maeda et al.

(10) Patent No.: US 8,204,231 B2
(45) Date of Patent: Jun. 19, 2012

(54) METHOD AND DEVICE FOR MANAGING CRYPTOGRAPHIC KEYS IN SECRET COMMUNICATIONS NETWORK

(75) Inventors: Wakako Maeda, Tokyo (JP); Akio Tajima, Tokyo (JP); Akihiro Tanaka, Tokyo (JP); Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 12/136,419

(22) Filed: Jun. 10, 2008

(65) Prior Publication Data

US 2009/0316910 A1    Dec. 24, 2009

(30) Foreign Application Priority Data

Jun. 11, 2007    (JP) .................. 2007-153807

(51) Int. Cl.
*H04L 9/08*    (2006.01)
(52) U.S. Cl. ...................................... 380/279
(58) Field of Classification Search .................. 380/279
See application file for complete search history.

(56) References Cited

U.S. PATENT DOCUMENTS

| 7,392,378 B1 * | 6/2008 | Elliott ........................... 713/153 |
| 2003/0131236 A1 * | 7/2003 | Sasmazel ...................... 713/171 |

FOREIGN PATENT DOCUMENTS

| JP | 2002-300158 | 10/2002 |
| JP | 2002-344438 | 11/2002 |

OTHER PUBLICATIONS

Bennett, C.H., and Brassard, G., "Quantum Cryptography: Public Key Distribution and Coin Tossing," IEEE International Conference on Computers, Systems, and Signal Processing, Bangalore, India, Dec. 10-12, 1984, pp. 175-179.
Ribordy, G., Gauiter, J., Gisin, N., Guinnard, O., and Zbinden, H., "Automated 'plug & play' quantum key distribution," Electronics Letters, Oct. 29, 1998, vol. 34, No. 22, pp. 2116-2117.
Townsend, P.D., "Quantum cryptography on multiuser optical fibre Networks," Nature, Jan. 2, 1997, vol. 385, pp. 47-49.
Tanaka, A., Tomita, A., Tajima, A.,Takeuchi, T., Takahashi, S., and Nambu, Y., "Temperature independent QKD system using alternative-shifted phase modulation method" in Proceedings of ECOC, 2004, Tu4.5.3; and.
Kimura T., Nambu Y., Hatanaka T., Tomita A., Kosaka H., and Nakamura K., "Single-photon Interference over 150 km Transmission Using Silica-based Integrated-optic Interferometers for Quantum Cryptography" Japanese Journal of Applied Physics, 2004, vol. 43, No. 9A/B, pp. L1217-L1219.

* cited by examiner

*Primary Examiner* — Jacob Lipman
(74) *Attorney, Agent, or Firm* — Scully, Scott, Murphy & Presser, P.C.

(57) ABSTRACT

A cryptographic key management method and device are provided by which cryptographic keys of multiple nodes can be managed easily and stably. A system includes at least one first node and a plurality of second nodes connected to the first node, and the first node individually generates and consumes a cryptographic key with each of the second nodes connected to the first node itself. A cryptographic key management device in such a system has a monitor that monitors the stored key amounts of cryptographic keys of the individual second nodes, stored at the first node, and a key management control section that performs key generation control on the first node, based on the stored key amounts.

36 Claims, 14 Drawing Sheets

METHOD AND DEVICE FOR MANAGING CRYPTOGRAPHIC KEYS IN SECRET COMMUNICATIONS NETWORK

BACKGROUND OF THE INVENTION

1. Field of the Invention

This application is based upon and claims the benefit of priority from Japanese Patent Application No. 2007-153807, filed on Jun. 11, 2007, the disclosure of which is incorporated herein in its entirety by reference.

The present invention relates to a secret communications network and, more particularly, to a method and device for managing cryptographic keys to be used between nodes.

2. Description of the Related Art

The Internet is an economic and social infrastructure over which various kinds of data are exchanged, and therefore it is an important issue to provide for preventive measures to protect the data flowing over the network beforehand from risks of eavesdropping. A secret communications system, in which data for communication is encrypted, can be cited as one of the preventive measures. There are two broad types of cryptographic methods: common key cryptography and public key cryptography.

The common key cryptography is a method using a common cryptographic key for encryption and decryption, as typified by AES (Advanced Encryption Standard). This method makes high-speed processing possible and therefore is used to encrypt data itself.

The public key cryptography, on the other hand, is a method using a one-way function, as typified by the RSA (Rivest, Shamir, Adleman) encryption algorithm. According to this method, encryption is performed by using a public key, and decryption is performed by using a private key. This method is used to distribute a cryptographic key for common key cryptography because it is not suitable for high-speed processing.

In secret communication that ensures secrecy by encrypting data, one of the important things to ensure secrecy is that encrypted data is not broken even if the encrypted data is intercepted by an eavesdropper. Accordingly, it is necessary not to keep using the same cryptographic key to encrypt data. This is because, if the same cryptographic key is continually used for encryption, the possibility is increased that the cryptographic key is estimated based on the increased amount of intercepted data.

Accordingly, it is required to update a cryptographic key shared between a sending side and a receiving side. When updating a key, it is absolutely necessary that the key to be updated should not be intercepted or broken. To this end, there are two broad types of methods: (1) a method by which a key is encrypted by means of public key encryption and then transmitted, and (2) a method by which a key is encrypted by using a master key, which is a common key preset for key update, and then transmitted (for example, see Japanese Patent Application Unexamined Publication Nos. 2002-344438 and 2002-300158). Security according to these methods depends on the fact that an enormous amount of calculation is required for cryptanalysis.

On the other hand, there have been proposed quantum key distribution (QKD) techniques. According to QKD, a cryptographic key is generated and shared between a sending side and a receiving side by the transmission of a single photon per bit, unlike ordinary optical communications (see Bennett, C. H., and Brassard, G., "QUANTUM CRYPTOGRAPHY: PUBLIC KEY DISTRIBUTION AND COIN TOSSING," IEEE International Conference on Computers, Systems, and Signal Processing, Bangalore, India, Dec. 10-12, 1984, pp. 175-179, and Ribordy, G., Gauiter, J., Gisin, N., Guinnard, O., and Zbinden, H., "Automated 'plug & play' quantum key distribution," Electronics Letters, 1998, Vol. 34, No. 22, pp. 2116-2117). This QKD technique ensures security not based on the amount of calculation as mentioned above but based on the quantum mechanics, and it has been proved that eavesdropping on a photon transmission part is impossible. Moreover, not only key generation and sharing between a single node and another single node, proposals have also been made to realize key generation and sharing between a single node and multiple nodes (hereinafter, referred to as 1:N key generation and sharing), or key generation and sharing between multiple nodes and multiple nodes (hereinafter, referred to as N:M key generation and sharing), by using an optical switching technique and a passive optical branching technique (see Townsend, P. D., "Quantum cryptography on multiuser optical fibre Networks," Nature, Jan. 2, 1997, Vol. 385, pp. 47-49).

According to such a QKD technique, since information that is the source of a cryptographic key is transmitted by being superimposed on each of single photons, it is possible to continue generating a cryptographic key as long as photon transmission is performed. For example, it is possible to generate several tens kilobits of final key per second.

Furthermore, perfectly secure encrypted communication can be achieved by using a QKD-generated cryptographic key for a one-time pad (OTP) cipher, which has been proved to be unbreakable. When encrypted communication is performed by using OTP cipher, a cryptographic key is consumed as much as the quantity of data and is always discarded once it is used. For example, when a 1-Mbit file is OTP-encrypted and then transmitted and received, a 1-Mbit cryptographic key is consumed on each of the sending and receiving sides.

As described above, in a quantum cryptographic system in which cryptographic keys are generated and consumed in large quantities, it is indispensable to manage the cryptographic keys stored in storage media. In the QKD technique in particular, it is important to manage cryptographic keys among multiple nodes to realize the expansion to 1:N or N:M key generation and sharing by using optical switching technique and/or passive optical branching technique as proposed in Townsend, P. D. cited above.

However, conventional technologies place importance on cryptographic key generation, and cryptographic key management has hardly been performed with consideration given to the fact that a cryptographic key is also consumed. As described above, the amount of a stored cryptographic key at each node is increased as a key generation and sharing process is performed, while the stored encryption key is consumed and its amount is decreased every time encrypted communication is performed. In addition, generally, key generation rates at which cryptographic keys are generated through the key generation and sharing process are not uniform among nodes because the key generation rate depends also on the distance between nodes and the quality of communication. Therefore, the amount of stored key at each node is increased/decreased from moment to moment. The management of cryptographic keys becomes more complicated as the number of nodes increases.

Moreover, in a 1:n network having a center-remote structure like 1:n connections, since a cryptographic key is generated and shared between a center node and each of n remote nodes, the cryptographic keys are not shared among remote nodes. Accordingly, encrypted communication cannot be performed between remote nodes. In a N:M connection network, encrypted communication can be performed between two nodes which have performed key generation and sharing process. However, encrypted communication cannot be performed between nodes which have never performed key generation and sharing process because no cryptographic key is shared between these nodes.

SUMMARY OF THE INVENTION

An object of the present invention is to provide a cryptographic key management method and device by which cryptographic keys of multiple nodes can be managed easily and stably.

According to the present invention, a device for managing cryptographic keys shared between a first node and each of a plurality of second nodes connected to the first node in a network system, wherein the network system has at least one network including the first node and the second nodes, includes: a monitor for monitoring amounts of cryptographic keys shared the first node and respective ones of the second nodes; and a key manager for managing generation of cryptographic keys in the first node based on the amounts of cryptographic keys.

According to the present invention, key generation control on a first node is performed based on the amounts of stored cryptographic keys (stored key amounts) of individual second nodes, stored at the first node, whereby cryptographic keys of the multiple nodes can be managed easily and stably.

DETAILED DESCRIPTION OF THE PREFERRED EMBODIMENTS

1. First Exemplary Embodiment 1.1) Network Structure

Figure 1B:
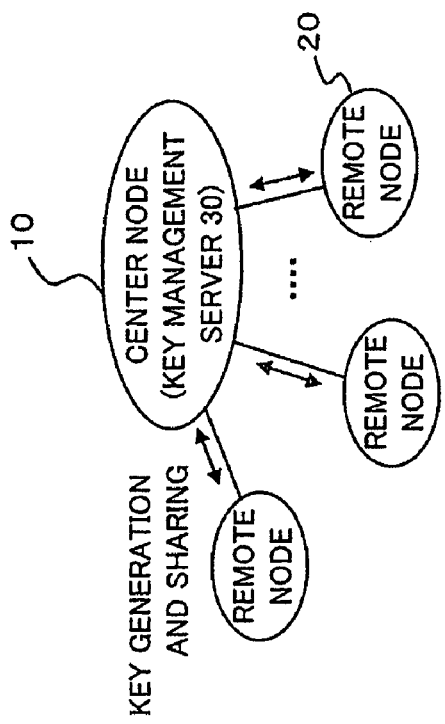
FIGS. 1A and 1B are schematic diagrams respectively showing two examples of a secret communications network to which a cryptographic key management system according to a first exemplary embodiment of the present invention is applied.
Figure 1A:
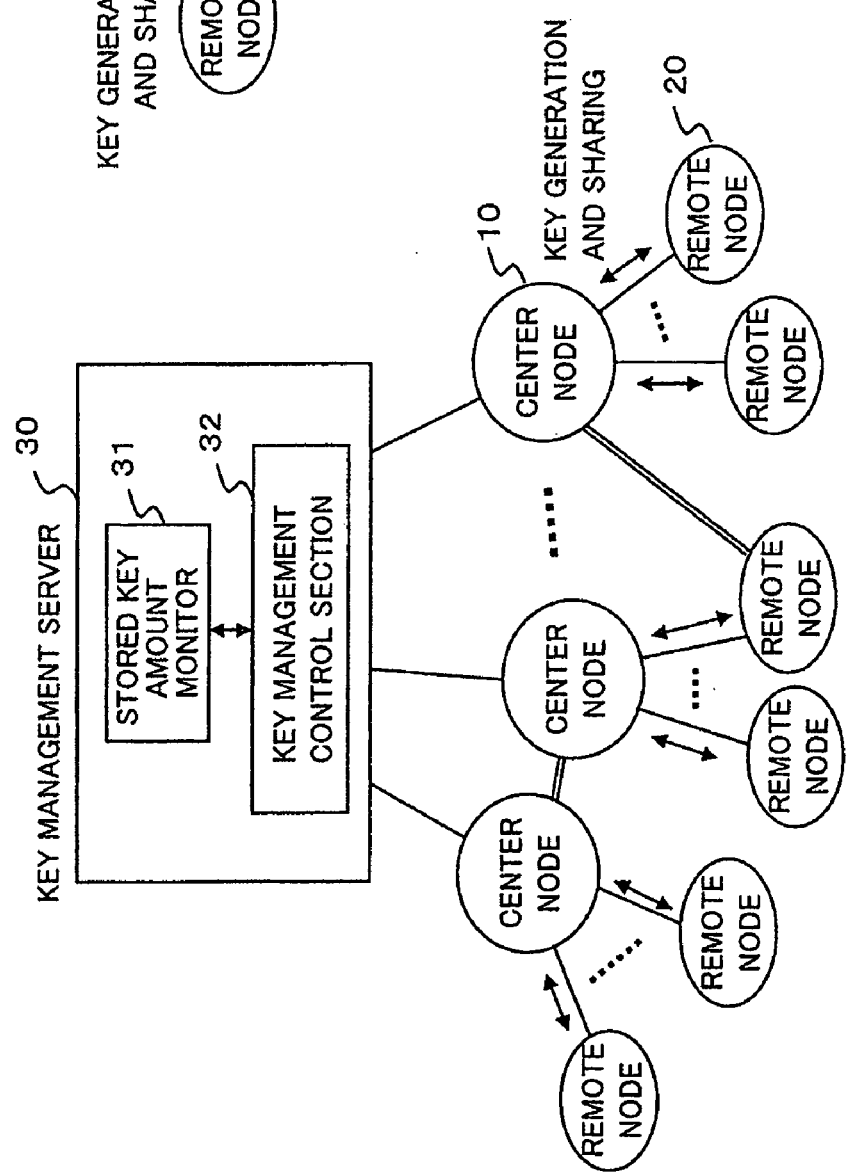

FIGS. 1A and 1B are schematic diagrams respectively showing two examples of a secret communications network to which a cryptographic key management system according to a first exemplary embodiment of the present invention is applied. Here, to avoid complicated description, it is assumed that the secret communications network shown in FIG. 1A includes a plurality of center nodes 10, a plurality of remote nodes 20, and a key management server 30, and that each of the center nodes 10 is connected to some of the remote nodes 20 and is connected to the key management server 30. Moreover, it is assumed that some connections between center nodes 10, between a center node 10 and a remote node 20, and/or between remote nodes 20 are made securely through closed paths, as indicated as an example by double lines in FIG. 1A, and that these entities in their entirety constitute a single network.

Additionally, each of the center nodes 10 generates and shares information to be used as cryptographic keys with each of the remote nodes 20 connected thereto, which will be described later, and consumes a cryptographic key each time encrypted communication is performed. The key management server 30 manages, for each remote node 20, the amount of stored shared-key information that has been generated or is to be consumed (hereinafter, this amount will be referred to as "stored key amount").

The key management server 30 is provided with a stored key amount monitor 31 and a key management control section 32. The stored key amount monitor 31 monitors the stored key amount of each remote node 20 at each center node 10. For example, the stored key amount monitor 31 can acquire the stored key amounts by periodically inquiring each center node 10. It is also possible that, when a key is generated or consumed between a center node 10 and a remote node 20, the generated or consumed amount is notified from the center node 10 to the key management server 30.

When a decrease occurs in a stored key amount, or when a request for encrypted communication is made, the key management control section 32 can instruct a center node 10 involved to start a key generation process.

Alternatively, with a key management table storing the stored key amounts monitored by the stored key amount monitor 31, the key management control section 32 may perform key generation control while referring to the key management table.

Incidentally, in the case of a 1:N network including one center node 10 which accommodates a plurality of remote nodes 20 as shown in FIG. 1B, the above-described functions of the key management server 30 can be executed by the center node 10. In other words, the key management server 30 shown in FIG. 1A is not necessarily provided physically separately from a center node 10, but it is sufficient that the key management sever 30 is logically separated.

1.2) Management of Cryptographic Key

Figure 2:
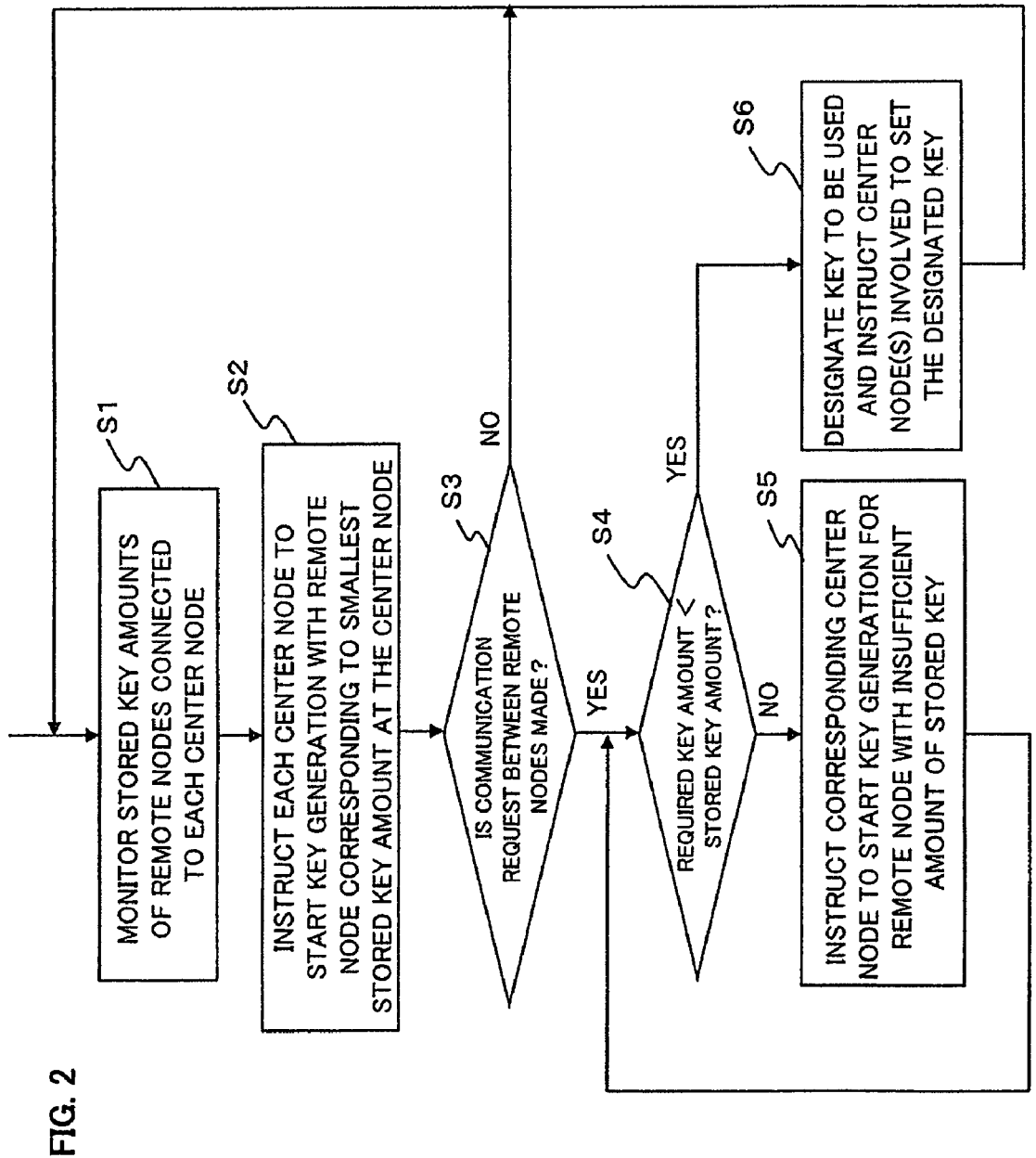
FIG. 2 is a flow chart showing a cryptographic key management method according to the first exemplary embodiment of the present invention.

FIG. 2 is a flow chart showing a cryptographic key management method according to the first exemplary embodiment of the present invention. The stored key amount monitor 31 monitors the stored key amounts at each center node 10, which are the amounts of respective stored key information shared between the center node 10 in question and individual remote nodes 20 connected to this center node 10 (Step S1). The key management control section 32 instructs each center node 10 to start a key generation process for the remote node 20 corresponding to the smallest stored key amount at the center node 10 (Step S2). Subsequently, the key management control section 32 determines whether or not a request for communication between remote nodes 20 is made (Step S3). When no request is made (Step S3: NO), the above-described Steps S1 and S2 are repeated, whereby the stored key amounts of the remote nodes 20 in the network can be made uniform, or can be kept at a predetermined amount or more.

When a request for encrypted communication between two remote nodes 20 is made (Step S3: YES), the key management control section 32 determines whether or not both of the stored key amounts respectively secured for the two remote nodes 20 are larger than the amount of a cryptographic key required for the encrypted communication (Step S4). When at least one of the stored key amounts is insufficient (Step S4: NO), the key management control section 32 instructs the center node 10 that accommodates the remote node 20 corresponding to the insufficient stored key amount, to start a key generation process (Step S5). The key generation process is continued until both of the stored key amounts of the two remote nodes 20 become larger than the required amount. Incidentally, in the case of OTP-encrypted communication, the amount of a cryptographic key required for encrypted communication is the same as the amount of transmission data.

When both of the stored key amounts of the two remote nodes 20 are (or become) larger than the amount of a cryptographic key required for this encrypted communication (Step S4: YES), the key management control section 32 instructs the center node(s) 10 involved to set a cryptographic key to be used for the encrypted communication in each of the two remote nodes 20 (Step S6).

In the case where a single center node 10 accommodates both of the remote nodes 20, the center node 10 shares key information (random numbers) with each of the remote nodes 20. Accordingly, for one of the remote nodes 20, the center node 10 determines the to-be-used cryptographic key from the random numbers and notifies information identifying the to-be-used cryptographic key. For the other remote node 20, the center node 10 OTP-encrypts the to-be-used cryptographic key by using key information shared with this other remote node 20 and transmits the to-be-used cryptographic key OTP-encrypted to the other remote node 20. In the case where the two remote nodes 20 belong to different center nodes 10 as shown in FIG. 1A, it is sufficient that the to-be-used cryptographic key is sequentially OTP-encrypted and forwarded through closed paths as indicated by double lines in FIG. 1A.

1.3) Effects

According to the first exemplary embodiment of the present invention, the key management server 30 performs key generation control based on the stored key amount of each remote node 20 connected to a center node 10, whereby it is possible to manage the cryptographic keys of multiple nodes easily and stably. For example, in a N:M QKD network, cryptographic key management for each remote node can be easily performed only by monitoring the amounts of quantum keys stored at a center node 10. For example, by performing cryptographic key management premised on cryptographic key consumption, it is possible to achieve stable OTP-encrypted communication between a center node 10 and a remote node 20.

2. Second Exemplary Embodiment 2.1) Structure and Configuration

Figure 3:
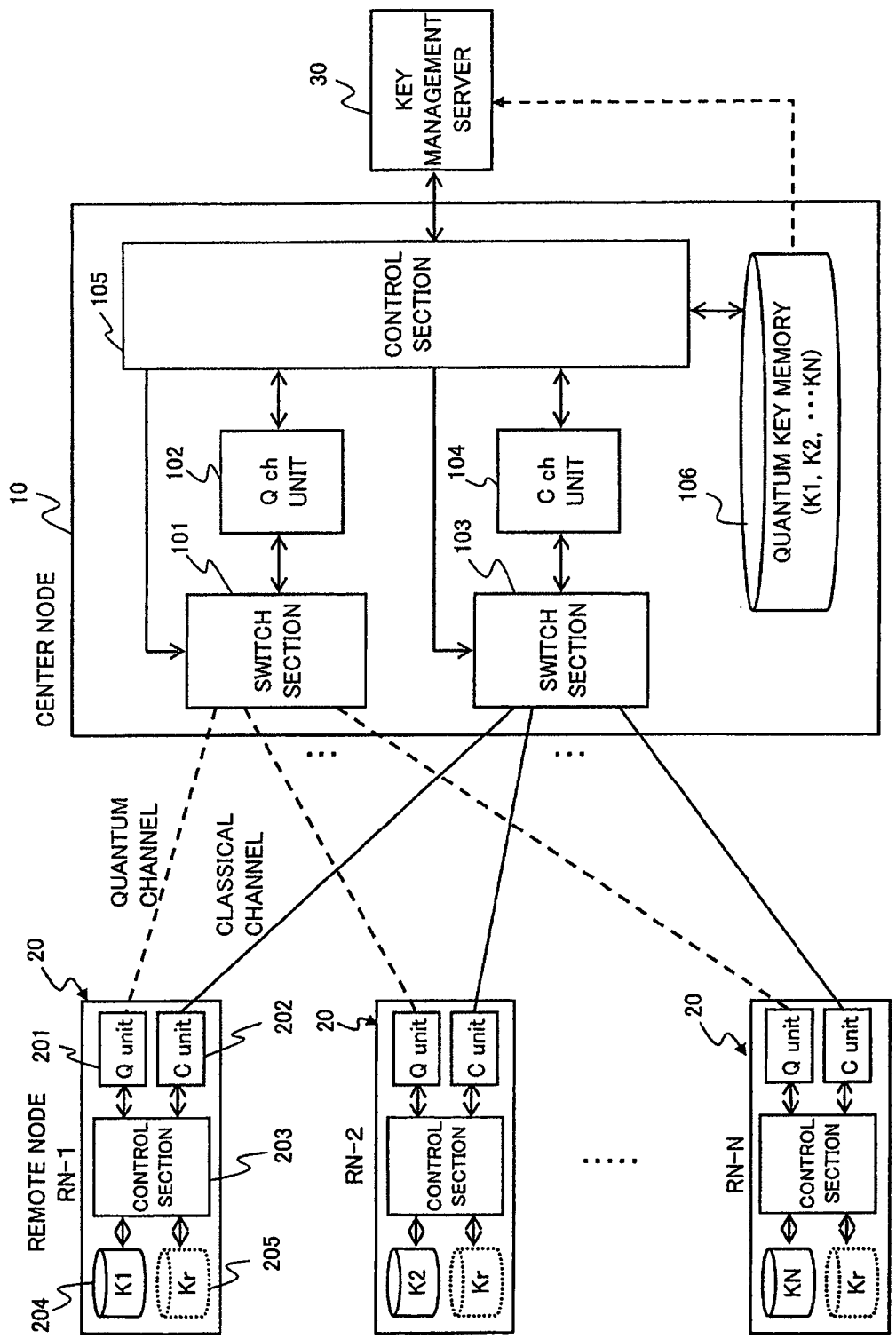
FIG. 3 is a block diagram showing the schematic structures and configurations of a center node and remote nodes in a secret communications network according to a second exemplary embodiment of the present invention.

FIG. 3 is a block diagram showing the schematic structures and configurations of a center node and remote nodes in a secret communications network according to a second exemplary embodiment of the present invention. Here, it is assumed that N (multiple) remote nodes 20 (hereinafter, referred to as remote nodes RN-1 to RN-N) are each connected to a center node 10 through optical fiber, and that cryptographic key generation and sharing, as well as encrypted communication using a cryptographic key, are performed between each remote node and the center node 10.

Each of the remote nodes RN-1 to RN-N has a similar configuration and includes a quantum channel unit 201, a classical channel unit 202, a control section 203 for controlling these units, a quantum key memory 204 for storing quantum key information, and a remote key memory 205 for storing a cryptographic key for communication between remote nodes.

The respective quantum key memories 204 of the remote nodes RN-1 to RN-N store random number sequences K1 to KN, respectively, which are generated and shared between the center node 10 and the remote nodes RN-1 to RN-N, respectively. Note that a random number sequence Kx is an example of quantum key information shared between a remote node RN-x and the center node 10, where x is 1, 2, . . . , or N. The remote key memory 205 stores, as required, a cryptographic key Kr for communication with another remote node. For example, when encrypted communication between the remote nodes RN-1 and RN-2 is requested, a cryptographic key Kr(1-2) is stored in each of the remote key memories 205 of these remote nodes RN-1 and RN-2.

The control section 203 carries out generation of shared random numbers, encryption/decryption using a part of the shared random numbers, and the like with the center node 10. The control section 203 can be a program-controlled processor, and the above-mentioned shared random number generation function and encryption/decryption function can be implemented by reading respective programs from a memory (not shown) and executing them on the program-controlled processor.

The center node 10 includes a switch section 101 for quantum channels, a quantum channel unit 102, a switch section 103 for classical channels, a classical channel unit 104, a control section 105 for controlling these sections and units, and a quantum key memory 106 for storing the shared random number sequences K1 to KN shared with the remote nodes RN-1 to RN-N, respectively. The control section 105 carries out generation of shared random numbers with each remote node, switching control of each of the switch sections 101 and 103, encryption/decryption using the shared random numbers, monitoring of each stored key amount in the quantum key memory 106, and the like.

The quantum channel unit 201 of each remote node and the quantum channel unit 102 of the center node 10 generate a random number sequence to be shared between them by transmission of a very-weak optical signal through a quantum channel and the switch section 101. Moreover, the classical channel unit 202 of each remote node and the classical channel unit 104 of the center node 10 mutually transmit and receive data for generation of the shared random number sequence through a classical channel and the switch section 103, and also mutually transmit and receive data encrypted based on the shared random number sequence through the classical channel and the switch section 103.

The control section 105 controls the switch section 101, whereby a quantum channel for one remote node selected from among the remote nodes RN-1 to RN-N can be connected to the quantum channel unit 102. Independently of this control of switching between quantum channels, the control section 105 controls the switch section 103, whereby a classical channel for one remote node selected from among the remote nodes RN-1 to RN-N can be connected to the classical channel unit 104.

A key management server 30 monitors each of the amounts of the shared random number sequences (key information) K1 to KN stored in the quantum key memory 106 of the center node 10. Here, it is assumed that the control section 105 of the center node 10 monitors each of the amounts of the key information stored (stored key amounts) in the quantum key memory 106, and information about the monitored stored key amounts is transmitted to the key management server 30, whereby the stored key amounts are monitored by the stored key amount monitor 31 of the key management server 30.

Each remote node stores the random number sequence generated with the center node 10 in the quantum key memory 204, and the center node 10 stores all of the random number sequences respectively generated with the remote nodes RN-1 to RN-N in the quantum key memory 106. Since the center node 10 thus keeps track of the quantum keys of all the remote nodes belonging to the center node 10 itself, it is sufficient for the key management server 30 to monitor the quantum key memory 106 of the center node 10. When the amount of a quantum key remaining in the quantum key memory 106 of the center node 10 has become small, the key management server 30 sends an instruction to the control section 105 of the center node 10, and the control section 105 then controls the quantum channel switch section 101 and quantum channel unit 102, whereby quantum key information can be generated preferentially with an intended remote node.

Incidentally, it is sufficient that a quantum channel and a classical channel can be discriminated as different channels. The quantum channel is a channel used to generate quantum key information, and the classical channel is a communication channel within a range of ordinary optical power and is used to transmit/receive data for generation of shared random numbers and to transmit/receive encrypted data. The quantum channel transmits an optical signal of very weak power including one photon per bit or fewer from a sender (Alice) to a receiver (Bob), but also can transmit an optical signal of optical power used for ordinary optical communication. The details thereof will be described later.

Note that only key management information, such as the file number and stored key amount of the quantum key, is exchanged between the key management server 30 and the center node 10 without any cryptographic key itself being disclosed. Accordingly, no key information is disclosed in the communication between the key management server 30 and the center node 10. It is also possible that the key management information is communicated secretly by encryption using a quantum key. Moreover, the key management server 30 can prevent spoofing by authentication of the center node 10.

Additionally, a quantum channel and a classical channel shown in FIG. 3 are multiplexed on optical fiber, and a method for multiplexing the channels is not particularly limited. If wavelength division multiplexing (WDM) is used, it is sufficient to make a configuration such that, with a wavelength multiplexer/demultiplexer provided before the switch sections 101 and 103, a quantum channel wavelength signal is demultiplexed to be input to the switch section 101 and a classical channel wavelength signal is demultiplexed to be input to the switch section 103.

2.2) Quantum Key Generation and Sharing

The control section 105 of the center node 10 and the control section 203 of any one of the remote nodes 20 control the entire operations of their respective nodes. Here, however, description will be given particularly of the key generation functions thereof. The control sections 105 and 203 carry out a predetermined key generation sequence, whereby a random number sequence used for a cryptographic (encryption/decryption) key is shared between the center node 10 and the remote node 20 in question. As a typical example, BB84 protocol (see Bennett, C. H., and Brassard, G. cited earlier), error detection and correction, and privacy amplification are performed, whereby a cryptographic key can be generated and shared. Description will be given below of a case, as an example, where the random number sequence K1 to be shared with the remote node RN-1 is generated.

First, the quantum channel unit 201 of the remote node RN-1 and the quantum channel unit 102 of the center node 10 perform single-photon transmission through the quantum channel. The quantum channel unit 102 of the center node 10 performs photon detection and outputs each result of the photon detection to the control section 105. Based on the results of the photon detection, the respective control sections 105 and 203 of the center node 10 and the remote node 20 perform basis reconciliation, error correction, and privacy amplification processing through the classical channel. In the center node 10, the shared random number sequence K1 thus obtained is stored in the quantum key memory 106, associated with the remote node RN-1. The respective shared random number sequences K2 to KN of the other remote nodes RN-2 to RN-N are sequentially generated through similar processing individually.

The quantum channel unit 201 of a remote node RN-x (x=1 to N) and the quantum channel unit 102 of the center node 10 correspond to one of Alice (the sender of a very weak optical signal) and Bob (the receiver of the very weak optical signal) and the other of them. However, since Bob includes a photon detector, it is preferable that Bob be located at the center node 10 from the viewpoints of power consumption and supervisory control.

Next, quantum key generation and sharing will be described in more detail by showing a QKD system as an example in which the center node 10 serves as Bob, applying a plug-and-play system to the quantum channel units 102 and 201.

Figure 4:
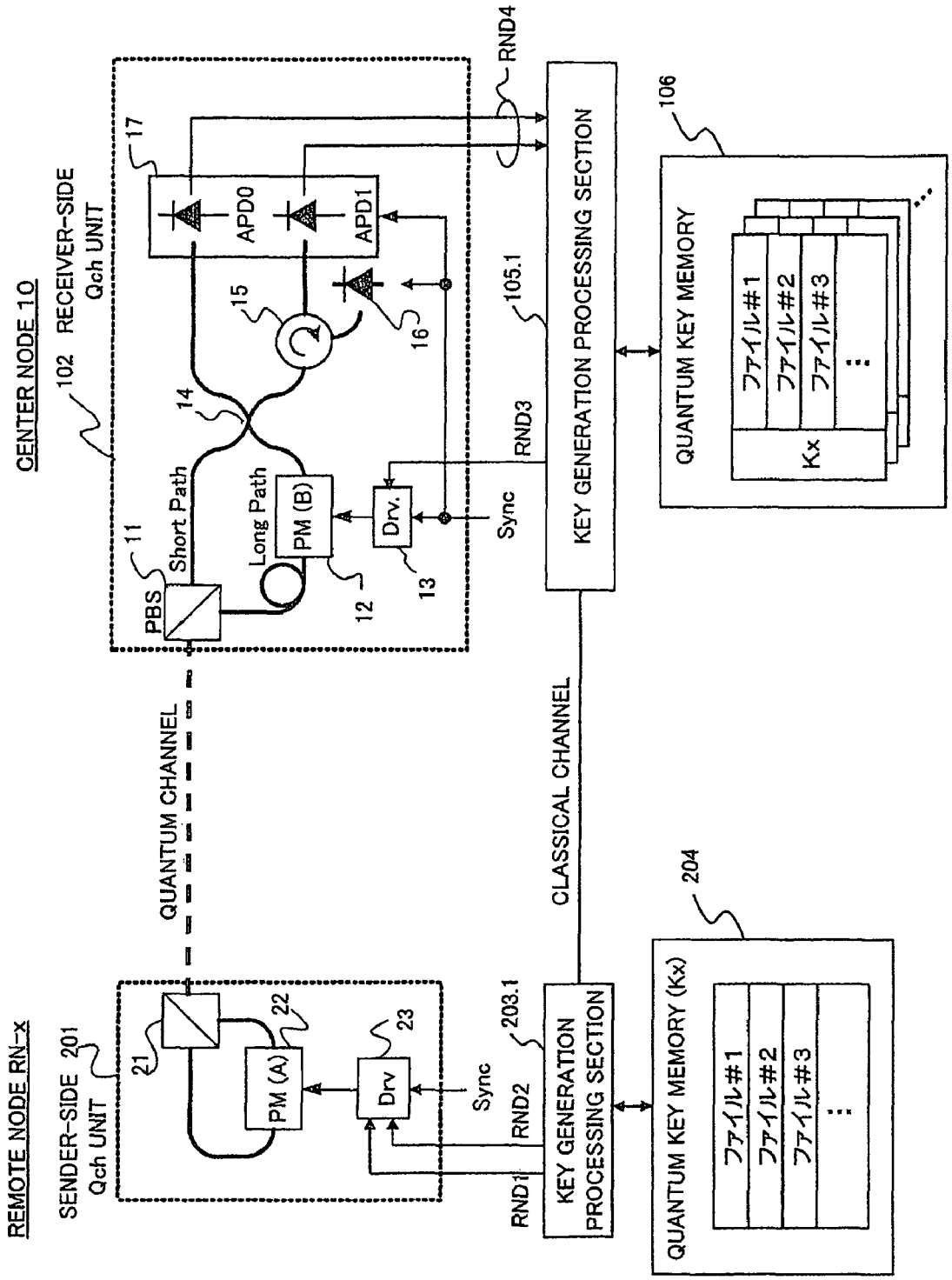
FIG. 4 is a block diagram showing a plug and play QKD system.

FIG. 4 is a block diagram showing a plug-and-play QKD system. The quantum channel unit 201 of the remote node RN-x is a quantum transmission section on Alice's side, and the quantum channel unit 102 of the center node 10 is a quantum reception section on Bob's side. It is assumed that the quantum channel units 201 and 102 are of an alternative-shifted phase modulation plug-and-play type (see Ribordy, G., et al. cited earlier, and Tanaka, A., Tomita, A., Tajima, A., Takeuchi, T., Takahashi, S., and Nambu, Y., "Temperature independent QKD system using alternative-shifted phase modulation method" in Proceedings of ECOC 2004, Tu4.5.3). Shown here is a case where a quantum channel and a classical channel are connected to the remote node RN-x by using the switch sections 101 and 103.

In this example, the sender-side quantum channel unit 201 has a PBS loop including a polarizing beam splitter (PBS) 21 and a phase modulator 22, and the PBS 21 is connected to optical fiber. The PBS loop has functionality similar to a Faraday mirror and outputs incident light with its polarization state rotated by 90 degrees (see Tanaka, A., et al. cited above).

The phase modulator 22 is driven by a driver 23 and, in accordance with a clock signal Sync fed from the classical channel unit 202, performs phase modulation on a sequence of optical pulses passing through the phase modulator 22. There are four phase modulation depths (0, π/2, π, 3π/2), which correspond to the four combinations of random numbers derived from two random-number sets RND1 and RND2, and phase modulation is performed when an optical pulse is passing through the phase modulator 22. The random-number sets RND1 and RND2, which are supplied from a key generation processing section 203.1, are stored for subsequent basis reconciliation processing.

The key generation processing section 203.1 is a functional section implemented by the control section 203. The key generation processing section 203.1 carries out a key generation process, whereby a shared random number sequence Kx is stored in the quantum key memory 204. The random number sequence Kx is stored in such a manner that positions in the random number sequence Kx can be determined in accordance with a predetermined criterion. Here, a constant amount of the random number sequence Kx is aggregated as a file, and each file is numbered, whereby the files of the random number sequence Kx can be identified based on the file numbers #1, #2 and so on.

The receiver-side quantum channel unit 102 includes a polarizing beam splitter (PBS) 11, a phase modulator 12, a driver 13, an optical coupler 14, an optical circulator 15, a pulse light source 16, and a photon detector 17, and the PBS 11 is connected to the optical fiber transmission line 60. The driver 13, pulse light source 16, and photon detector 17 operate in synchronism with a clock signal Sync fed from the classical channel unit 104. The driver 13 drives the phase modulator 12 based on a random number set RND3 supplied from a key generation processing section 105.1. The phase modulator 12 performs phase modulation on each optical pulse passing through the phase modulator 12.

The pulse light source 16 is driven in accordance with the clock signal Sync. An optical pulse P generated by the optical light source 16 is led by the optical circulator 15 to the optical coupler 14, where the optical pulse P is split into two parts. One of the two parts, an optical pulse P1, goes along a short path and is sent to the PBS 11. The other one of the two parts, an optical pulse P2, passes through the phase modulator 12, which is provided in a long path, and is sent to the PBS 11. These optical pulses P1 and P2 are combined at the PBS 11 to become temporally divided double pulses, which are then transmitted to the sender-side quantum channel unit 201 through the optical fiber transmission line 60.

In the sender-side quantum channel unit 201, the double pulses P1 and P2 on the quantum channel that have arrived through the optical fiber transmission line are each further split into two parts to become clockwise double pulses P1$cw$ and P2$cw$ and counterclockwise double pulses P1$ccw$ and P2$ccw$, that is, quartet pulses. The clockwise pair and the counterclockwise pair pass through the phase modulator 22 in directions opposite to each other, and each pair enters a PBS port that is the other one than a port from which the pair came out.

The phase modulator 22 performs phase modulation on the second one (pulse P2$cw$) of the clockwise double pulses, relatively to the first one (pulse P1$cw$). At the same time, the phase modulator 22 gives a phase difference of π between the counterclockwise double pulses and the clockwise double pulses. The quartet pulses thus phase-modulated as required are combined at the PBS 21 to return to double pulses again.

Since only the second pulse has been phase-modulated based on any one of the four combinations of random numbers derived from the two random-number sets RND1 and RND2, the output double pulses will be represented by "P1" and "P2$*^a$." At this time, since the polarizations of the pulses at the time of egress from the PBS loop have been rotated by 90 degrees respectively to the polarizations at the time of ingress into the PBS loop, an effect equivalent to that of a Faraday mirror can be resultantly obtained.

Since the polarizations of the optical pulses P1 and P2$*^a$ received from the sender-side quantum channel unit 201 have been rotated by 90 degrees, the PBS 11 of the receiver-side quantum channel unit 102 leads each of these received pulses to the long or short path that is different from the one the pulse used when it was transmitted to the sender side. That is, the received optical pulse P1 is led along the long path and phase-modulated based on the random-number set RND3 by the phase modulator 12, and a phase-modulated optical pulse P1$*^b$ arrives at the optical coupler 14. On the other hand, the optical pulse P2$*^a$ travels along the short path, which is different from the one the optical pulse P2 used at the time of transmission, and similarly arrives at the optical coupler 14.

In this manner, the optical pulse P2$*^a$, phase-modulated in the sender-side quantum channel unit 201, and the optical pulse P1$*^b$, phase-modulated in the receiver-side quantum channel unit 102, interfere with each other at the optical coupler 14. A result of this interference is detected as a random number sequence RND4 by any one of avalanche photodiodes APD0 and APD1 of the photon detector 17. The photon detector 17 is driven in a Geiger mode in accordance with the clock signal Sync fed from the classical channel unit 104 and performs sensitive reception. Photon transmission is thus carried out by the sender-side quantum channel unit 201 and the receiver-side quantum channel unit 102 as described above.

The key generation processing section 105.1 is a functional section implemented by the control section 105. The key generation processing section 105.1 carries out a key generation process based on the detected random number sequence RND4, whereby the shared random number sequence Kx is stored in the quantum key memory 106. The random number sequence Kx is stored in such a manner that positions in the random number sequence Kx can be determined in accordance with a predetermined criterion. Here, a constant amount of the random number sequence Kx is aggregated as a file, and each file is numbered, whereby the files of the random number sequence Kx can be identified based on the file numbers #1, #2, and so on. In this manner, the respective random number sequences K1 to KN of the remote nodes RN-1 to RN-N are stored in the quantum key memory 106.

2.3) Sharing of Remote Key

Next, description will be given of a method by which remote nodes securely share a cryptographic key by using OTP-encrypted communication. Of the N remote nodes RN-1 to RN-N, any two remote nodes that desire to perform encrypted communication send a request for a remote key to the key management server 30. Hereinafter, by taking a case, as an example, where a request is made for encrypted communication between the remote nodes RN-1 and RN-2, description will be given of a procedure for sharing a remote key Kr(1-2) to be used for the encrypted communication between these remote nodes. Incidentally, a remote key that has been successfully shared is stored in the remote key memory 205 of each remote node.

Figure 5:
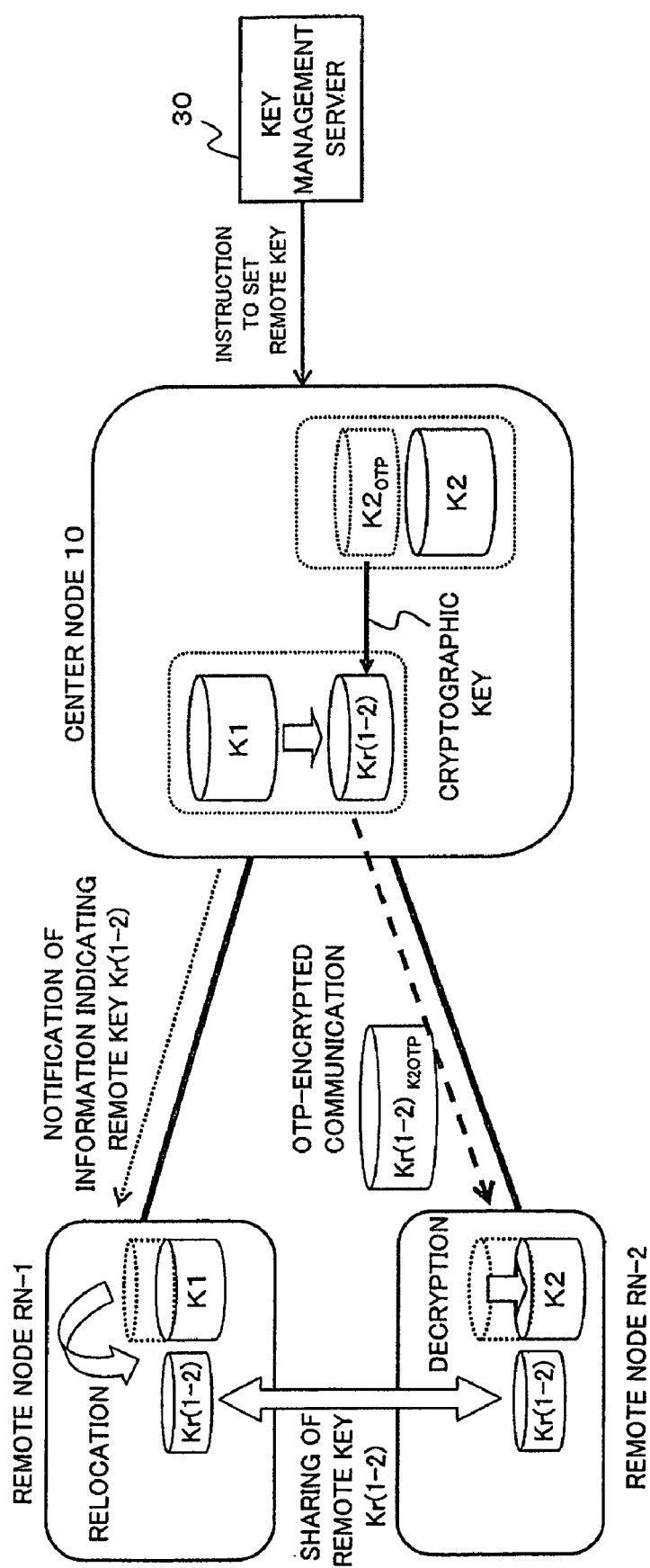
FIG. 5 is a schematic diagram to describe a procedure for sharing a remote key between remote nodes.
Figure 6:
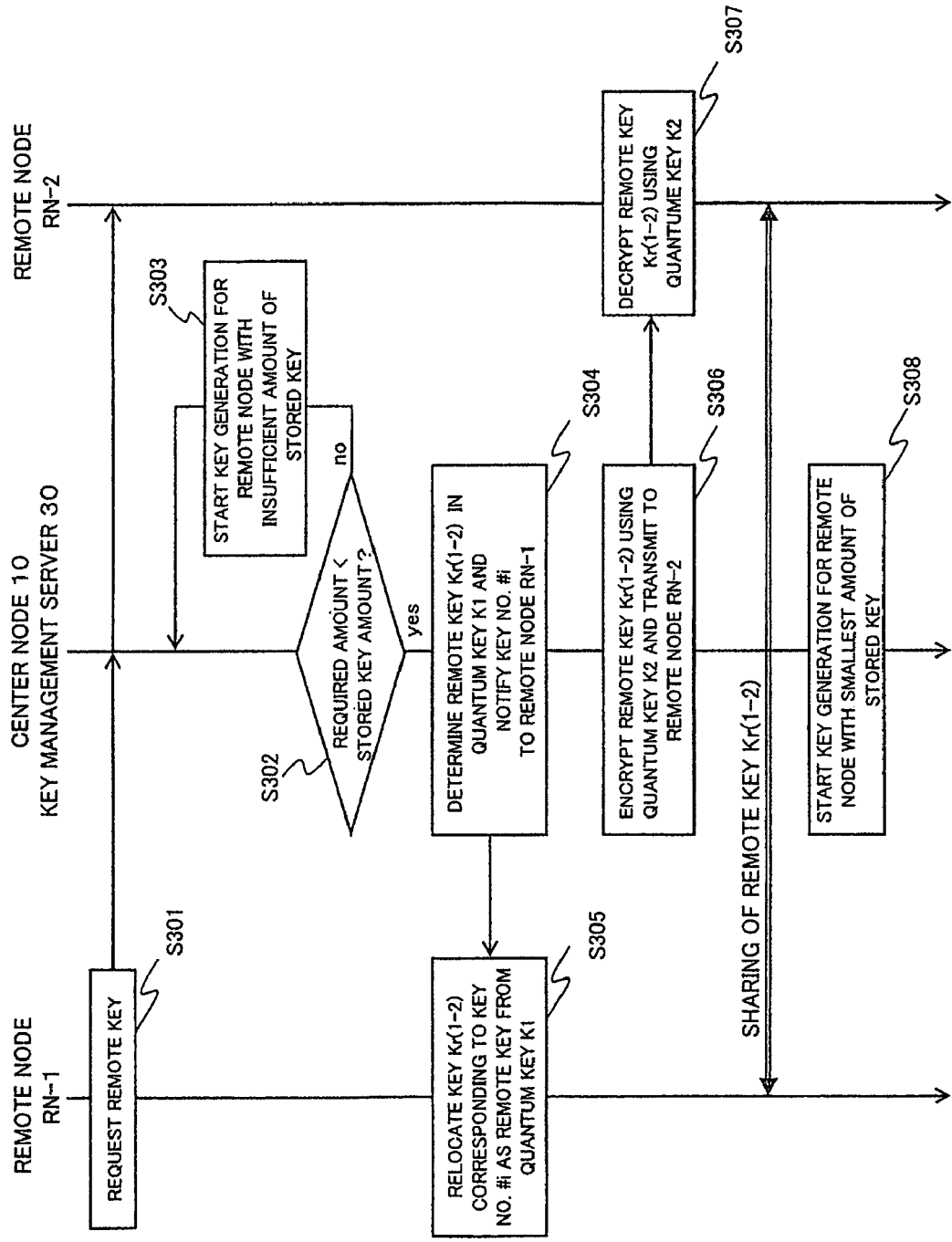
FIG. 6 is a sequence diagram showing the procedure for sharing a remote key.

FIG. 5 is a schematic diagram to describe a procedure for sharing a remote key between remote nodes. FIG. 6 is a sequence diagram showing the procedure for sharing a remote key. Here, it is assumed that the remote node RN-1 sends a request for a remote key to the key management server 30 through the center node 10, in order to perform encrypted communication with the remote node RN-2 (Step S301). Upon receipt of this request for a remote key, the key management server 30 checks the respective stored key amounts (remaining amounts) of the random number sequences K1 and K2 of the remote nodes RN-1 and RN-2 (Step S302). If at least one of the remaining amounts of the random number sequences K1 and K2 is not larger than a required amount of a remote key (Step 302: NO), the key management server 30 instructs the center node 10 to start a key generation process for the remote node corresponding to the insufficient stored key amount (Step S303). At this instruction, the control section 105 of the center node 10 switches the quantum channel switch section 101 to the designated remote node and carries out the key generation process for the remote node in question. If neither of the remaining amounts of the random number sequences K1 and K2 are larger than the required amount, key generation is started first for the remote node corresponding to the smaller remaining amount.

If both of the remaining amounts of the random number sequences K1 and K2 are larger than the required amount (Step S302: YES), the key management server 30 instructs the center node 10 to start a remote key sharing process. First, at the instruction from the key management server 30, the center node 10 selects a part to be used as the remote key Kr(1-2) from the random number sequence K1 and notifies the remote node RN-1, through the classical channel, of information indicating the range corresponding to the remote key Kr(1-2) (Step S304). The remote node RN-1 performs processing for relocating the part corresponding to the remote key, of the quantum key information (random number sequence) K1 stored in the quantum key memory 204, into the remote key memory 205 as the remote key Kr(1-2) (Step S305). In the case where the remote node manages the random number sequence in the quantum key memory 204 in such a manner that a constant amount of the random number sequence is aggregated as a file and files are numbered in order of generation as described above, when the center node 10 notifies the remote node RN-1 of information identifying the remote key Kr(1-2), it is sufficient that the center node 10 transmits only the file number through the classical channel.

Next, the center node 10 extracts a quantum key $K2_{OTP}$ from the random number sequence K2 that has been shared with the remote node RN-2, OTP-encrypts the remote key Kr(1-2) by using the quantum key $K2_{OTP}$, and transmits the OTP-encrypted remote key Kr(1-2) to the remote node RN-2 through the classical channel (Step S306).

The remote node RN-2 extracts the same quantum key $K2_{OTP}$ from its own random number sequence K2, decrypts the OTP-encrypted remote key Kr(1-2), and stores the remote key Kr(1-2) in the remote key memory 205 (Step S307). Here, the range (file number) of the quantum key $K2_{OTP}$ used for OTP-encryption can also be designated by the key management server 30.

The one-time pad (OTP) encryption is an encryption scheme that uses a cryptographic key equal to plain text in quantity and guarantees that cipher text is unbreakable unless the cryptographic key has periodicity. The remote key Kr(1-2) is OTP-encrypted by using the quantum key $K2_{OTP}$ and OTP-delivered, whereby the remote node RN-2 can securely share the remote key Kr(1-2).

2.4) Replenishment of Cryptographic Key

When OTP-encrypted communication between the remote nodes occurs as described above, the random number sequence K2 shared between the center node 10 and the remote node RN-2 is consumed. Generally, a shared random number sequence is consumed also when encrypted communication is performed through a classical channel between the center node 10 and a remote node connected to the center node 10. On the other hand, in the center node 10, since switching of the quantum channel switch section 101 and switching of the classical channel switch section 103 can be performed independently of each other as described already, key generation through a quantum channel can also be carried out in parallel with the consumption of a shared random number sequence with each remote node. As described above, the stored key amount of each remote node repeats increasing and decreasing at all times.

Accordingly, when the OTP delivery is complete, the key management server 30 detects a random number sequence having the smallest remaining amount among the shared random number sequences K1 to KN stored in the quantum key memory 106 of the center node 10, and instructs the center node 10 to start a key generation process with the remote node corresponding to the smallest remaining amount (Step S308). That is, in accordance with the instruction from the key management server 30, the control section 105 of the center node 10 switches the quantum channel switch section 101 to the designated remote node and starts the key generation process. This remote node for which key generation is performed is not necessarily the remote node (here, the remote node RN-2) to which OTP delivery has been performed. This is because a quantum key is consumed not only by performing OTP delivery but also by performing encrypted communication. Accordingly, it is preferable that Step S308 be executed whenever encrypted communication is performed. Note that higher priority is placed on Step S303, which is a key generation process performed when a request for a remote key is made, than on Step S308.

As described above, even if a quantum key is consumed due to OTP-encrypted communication, the key management server 30 monitors the stored key amounts at the center node 10 and appropriately makes an instruction to start key generation, whereby the stored key amounts can be made uniform among the remote nodes. Thus, it is possible to provide stable OTP-encrypted communication between the center node 10 and each remote node.

3. Third Exemplary Embodiment 3.1) Structure

Figure 7:
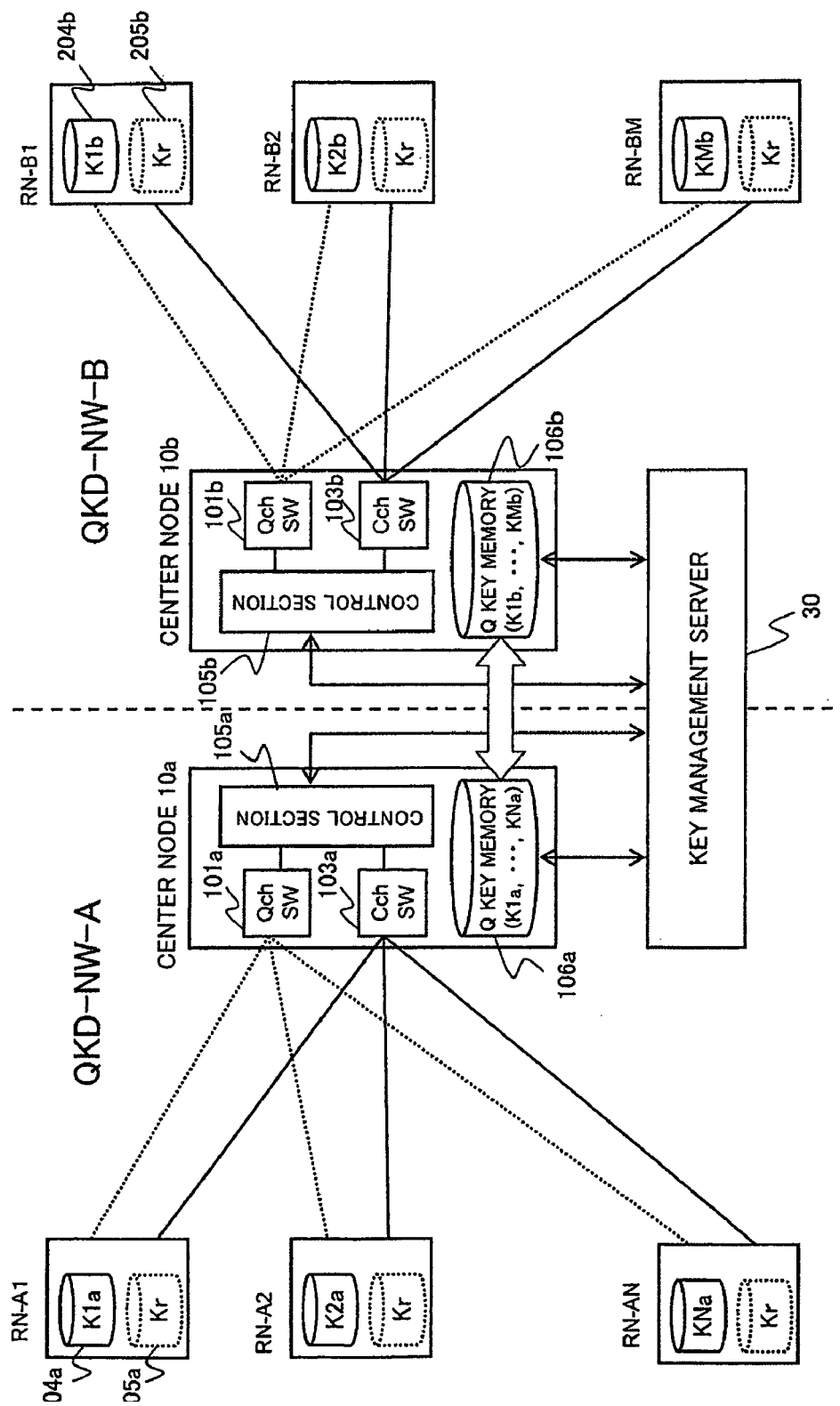
FIG. 7 is a block diagram showing the schematic structures of a center node and remote nodes in a secret communications network according to a third exemplary embodiment of the present invention.

FIG. 7 is a block diagram showing the schematic structures of center nodes and remote nodes in a secret communications network according to a third exemplary embodiment of the present invention. In the present exemplary embodiment, description will be given of a case where a remote key is shared between remote nodes belonging to different center nodes in a N:M connection network.

First, in a QKD network A (QKD-NW-A), each of N remote nodes RN-A1 to RN-AN is connected to a center node 10a thorough optical fiber, constituting a 1:N network. In a QKD network B (QKD-NW-B), each of M remote nodes RN-B1 to RN-BM is connected to a center node 10b through optical fiber, constituting a 1:M network.

Each remote node and the center node in each QKD network perform a cryptographic key generation process, a cryptographic key sharing process, and encrypted communication using a cryptographic key as described above. The configuration of each remote node and the configuration of each center node are basically the same as those shown in FIG. 3. In FIG. 7, for simplicity, the quantum channel units and classical channel units of the center nodes and the control sections of the remote nodes are omitted.

Additionally, it is assumed that the center nodes 10a and 10b can securely exchange a quantum key. An example of such a case is that the center nodes 10a and 10b are on a closed network installed inside the same data center and, even if encrypted communication is not particularly performed, security is guaranteed from the viewpoints of placement and management of devices. Accordingly, if the center nodes 10a and 10b are seen as a single center node, the networks shown in FIG. 7 can be regarded as a M:N network in which M remote nodes and N remote nodes are connected through optical fiber.

A key management server 30 monitors the respective quantum key memories 106a and 106b of the center nodes 10a and 10b. In each remote node, a generated random number sequence is stored in the quantum key memory 204a or 204b. In the center node 10a, random number sequences respectively generated with the remote nodes RN-A1 to RN-AN are all stored in the quantum key memory 106a. In the center node 10b, random number sequences respectively generated with the remote nodes RN-B1 to RN-BM are all stored in the quantum key memory 106b. Since each center node thus keeps track of the quantum keys of all the remote nodes belonging to the center node itself, it is sufficient for the key management server 30 to monitor the respective quantum key memories 106a and 106b of the center nodes 10a and 10b. In accordance with the remaining amounts of the quantum keys at the center nodes 10a and 10b, as described above, the key management server 30 sends an instruction to the control section 105a/105b, which then controls the quantum channel switch section 101a/10b, whereby a quantum key can be preferentially generated with an intended remote node. Quantum key generation and sharing are as described in 2.2), and therefore description thereof will be omitted here.

3.2) Sharing of Remote Key

Figure 8:
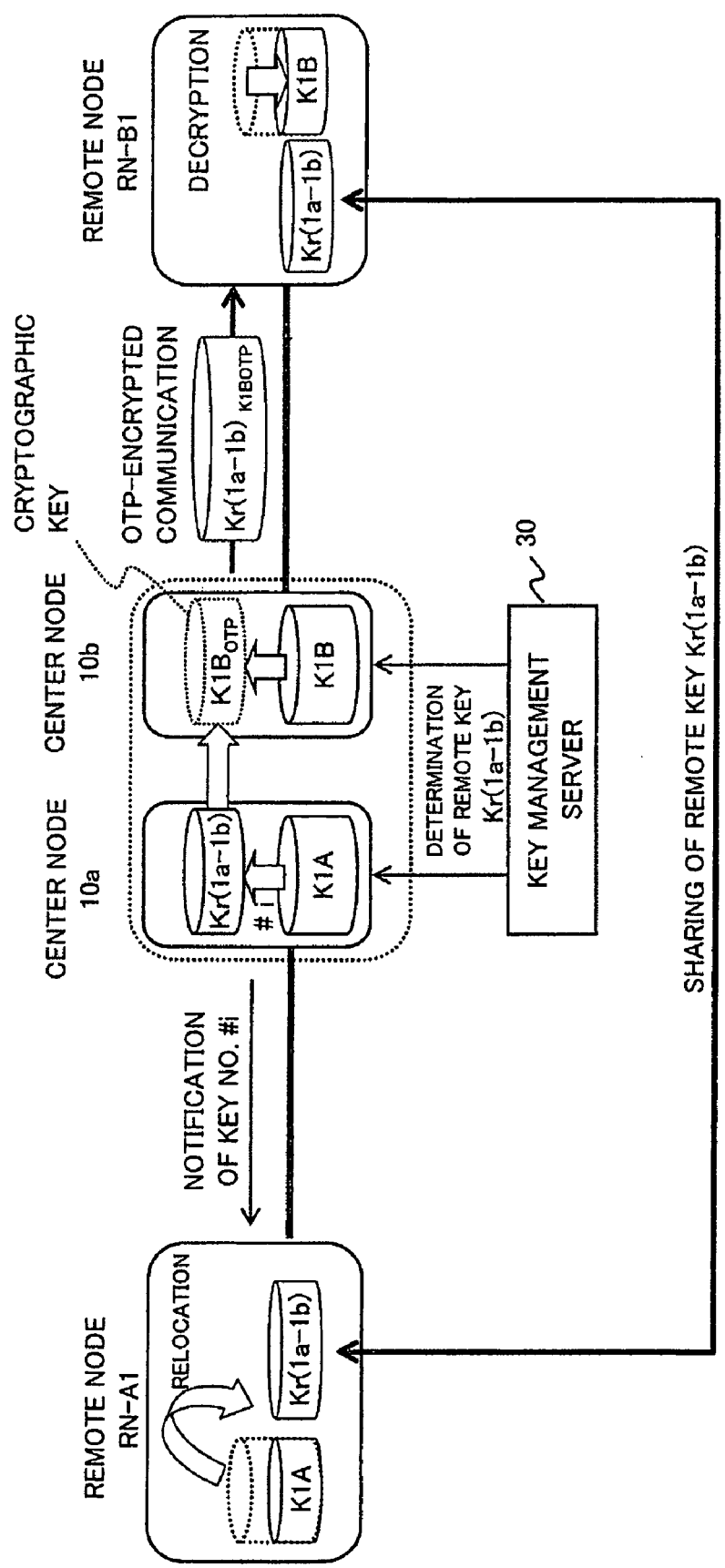
FIG. 8 is a schematic diagram to describe a procedure for sharing a remote key between remote nodes.
Figure 9:
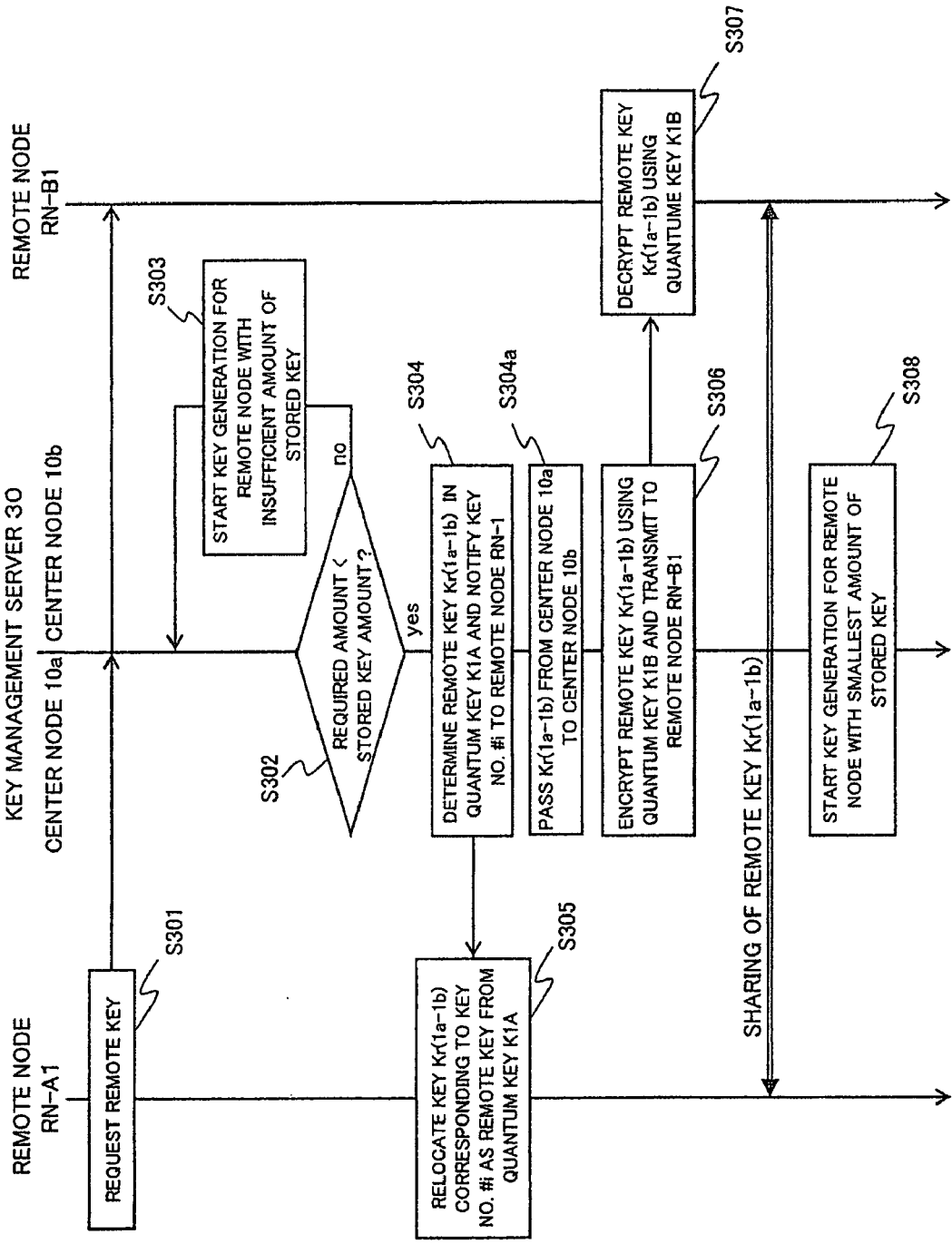
FIG. 9 is a sequence diagram showing the procedure for sharing a remote key.

FIG. 8 is a schematic diagram to describe a procedure for sharing a remote key between remote nodes, and FIG. 9 is a sequence diagram showing the procedure for sharing a remote key. Here, description will be given of a case, as an example, where a remote key Kr(1a-1b) is securely shared between the remote node RN-A1 belonging to the center node 10a and the remote node RN-B1 belonging to the center node 10b. Note that the same steps as in FIG. 6 are denoted by using the same reference symbols and numerals as in the FIG. 6, and description thereof will be simplified.

First, it is assumed that the remote node RN-A1 sends a request for a remote key to the key management server 30 through the center node 10a, in order to perform encrypted communication with the remote node RN-B1 (Step S301). Upon receipt of this request for a remote key, the key management server 30 checks the respective stored key amounts (remaining amounts) of the random number sequences K1A and K1B of the remote nodes RN-A1 and RN-B1 (Step S302). If at least one of the remaining amounts of the random number sequences K1A and K1B is not larger than a required amount of a remote key (Step 302: NO), the key management server 30 instructs the center node 10a/10b to start a key generation process for the remote node corresponding to the insufficient stored key amount (Step S303). At this instruction, the control section 105 of the center node 10a/10b switches the quantum channel switch section 101 to the designated remote node and carries out a key generation process for the remote node in question. If neither of the remaining amounts of the random number sequences K1A and K1B are larger than the required amount, key generation is started first for the remote node corresponding to the smaller remaining amount.

If both of the remaining amounts of the random number sequences K1A and K1B are larger than the required amount of a remote key (Step S302: YES), the key management server 30 instructs the center nodes 10a and 10b to start a remote key sharing process. First, at the instruction from the key management server 30, the center node 10a selects a part to be used as the remote key Kr(1a-1b) from the random number sequence K1A, and notifies the remote node RN-A1, through the classical channel, of information indicating the range corresponding to the remote key Kr(1a-1b) (Step S304). The remote node RN-A1 performs processing for relocating the part corresponding to the remote key, of the quantum key (random number sequence) K1A stored in the quantum key memory 204, into the remote key memory 205 as the remote key Kr(1a-1b) (Step S305). In the case where the remote node manages the random number sequence in the quantum key memory 204 in such a manner that a constant amount of the random number sequence is aggregated as a file and files are numbered in order of generation as described earlier, when the center node 10a notifies the remote node RN-A1 of information identifying the remote key Kr(1a-1b), it is sufficient that the center node 10a transmits only the file number through the classical channel.

Subsequently, the center node 10a passes the remote key Kr(1a-1b) to the center node 10b (Step 304a). Here, encryption is not particularly performed because the center nodes 10a and 10b are connected through a closed path.

Next, the center node 10b extracts a quantum key $K1B_{OTP}$ from the random number sequence K1B that is shared with the remote node RN-B1, OTP-encrypts the remote key Kr(1a-1b) by using the quantum key $K1B_{OTP}$, and transmits the OTP-encrypted remote key Kr(1a-1b) to the remote node RN-1B through the classical channel (Step S306).

The remote node RN-1B extracts the same quantum key $K1B_{OTP}$ from its own random number sequence K1B, decrypts the OTP-encrypted remote key Kr(1a-1b), and stores the remote key Kr(1a-1b) in the remote key memory 205 (Step S307). Here, the range (file number) of the quantum key $K1B_{OTP}$ used for OTP encryption can also be designated by the key management server 30.

The one-time pad (OTP) encryption is an encryption scheme that uses a cryptographic key equal to plain text in quantity and guarantees that cipher text is unbreakable unless the cryptographic key has periodicity. The remote key Kr(1a-1b) is OTP-encrypted by using the quantum key $K1B_{OTP}$ and OTP-delivered, whereby the remote node RN-1B can securely share the remote key Kr(1a-1b).

3.3) Replenishment of Cryptographic Key

When OTP-encrypted communication between the remote nodes occurs as described above, the random number sequence K1B shared between the center node 10b and the remote node RN-1B is consumed. Generally, a shared random number sequence is consumed also when encrypted communication is performed though a classical channel between a center node and a remote node connected to the center node. On the other hand, in a center node, since switching of the quantum channel switch section 101 and switching of the classical channel switch section 103 can be performed independently of each other as described already, key generation through a quantum channel can also be carried out in parallel with the consumption of a shared random number sequence with each remote node. As described above, the stored key amount of each remote node repeats increasing and decreasing at all times.

Accordingly, when the OTP delivery is complete, the key management server 30 detects a random number sequence having the smallest remaining amount among the shared random number sequences stored in the respective quantum key memories 106a and 106b of the center nodes 10a and 10b, and instructs the center node 10a/10b to start a key generation process with the remote node corresponding to the smallest remaining amount (Step S308). That is, in accordance with the instruction from the key management server 30, the control section 105 of the center node 10a/10b switches the quantum channel switch section 101 to the designated remote node and starts the key generation process. This remote node for which key generation is performed is not necessarily the remote node (here, the remote node RN-B1) to which OTP delivery has been performed. This is because a quantum key is consumed not only by performing OTP delivery but also by performing encrypted communication. Accordingly, it is preferable that Step S308 be executed whenever encrypted communication is performed. Note that higher priority is placed on Step S303, which is a key generation process performed when a request for a remote key is made, than on Step S308.

As described above, even if a quantum key is consumed due to OTP-encrypted communication, the key management server 30 monitors the stored key amounts at the center nodes 10a and 10b and appropriately makes an instruction to start key generation, whereby the stored key amounts can be made uniform among the remote nodes. Thus, it is possible to provide stable OTP-encrypted communication between the center node 10a/10b and each remote node.

4. Fourth Exemplary Embodiment

4.1) Structure

Figure 10:
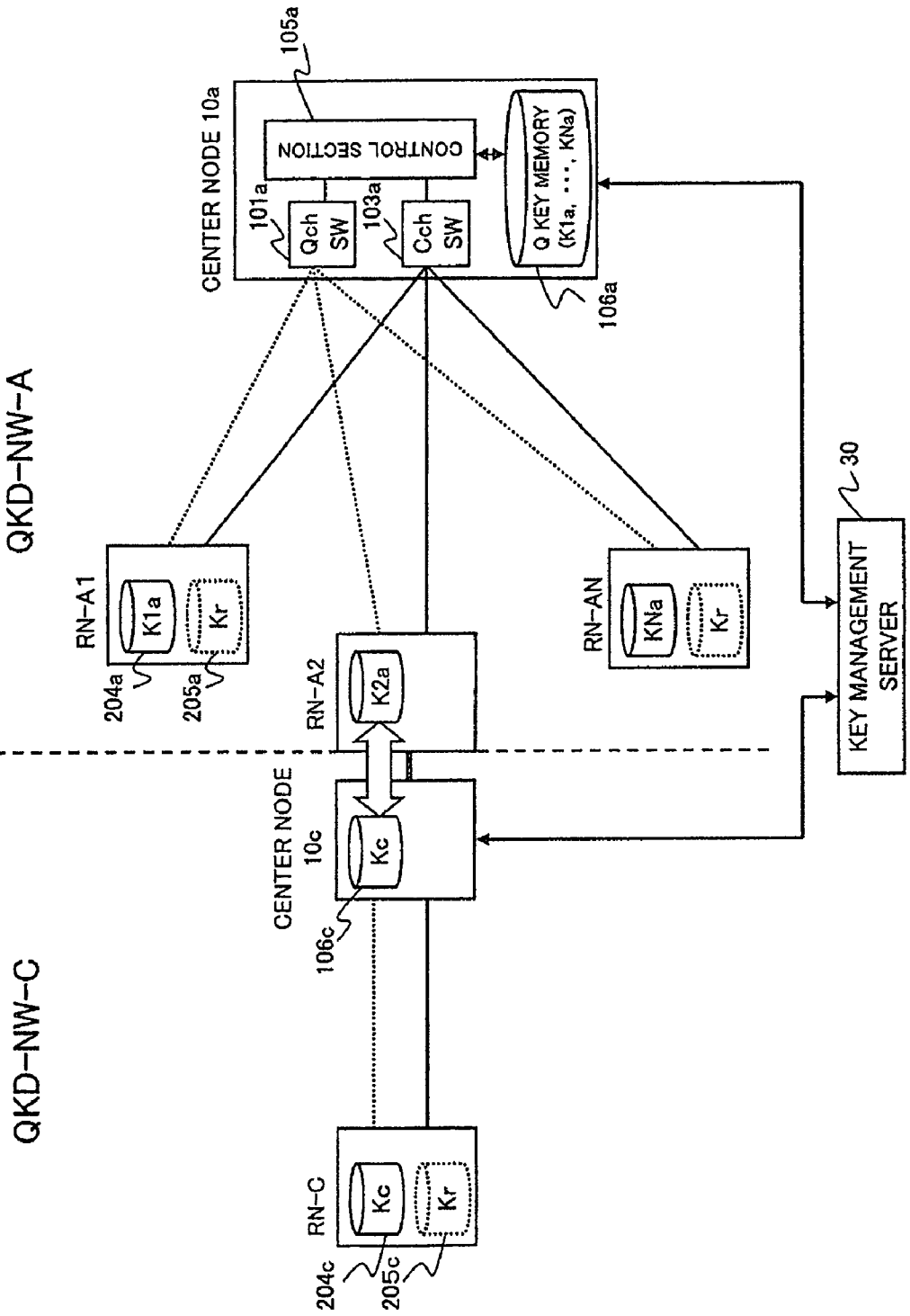
FIG. 10 is a block diagram showing the schematic structures of center nodes and remote nodes in a secret communications network according to a fourth exemplary embodiment of the present invention.

FIG. 10 is a block diagram showing the schematic structures of center nodes and remote nodes in a secret communications network according to a fourth exemplary embodiment of the present invention. The present exemplary embodiment shows an example in which a center node is used as a transit node, whereby a remote key is shared between remote nodes belonging to different center nodes.

First, in a QKD network A (QKD-NW-A), each of N remote nodes RN-A1 to RN-AN is connected to a center node 10a through optical fiber, constituting a 1:N network. In a QKD network C (QKD-NW-C), a remote node RN-C is connected to a center node 10c through optical fiber, constituting a point-to-point network. Accordingly, in FIG. 10, the switch sections 101 and 103 are not shown in the center node 10c.

Each remote node and the center node in each QKD network perform a cryptographic key generation process, a cryptographic key sharing process, and encrypted communication using a cryptographic key as described already. The configuration of each remote node and the configuration of each center node are basically the same as those shown in FIG. 3. In FIG. 10, for simplicity, the quantum channel units and classical channel units of the center nodes and the control sections of the remote nodes are omitted.

Here, it is assumed that the center node 10c and the remote node RN-A2 on the QKD-NW-A can securely exchange a quantum key. An example of this case is that the center node 10c and the remote node RN-A2 are on a closed network installed inside the same data center and, even if encrypted communication or the like is not particularly performed, security is guaranteed from the viewpoints of placement and management of devices. According to the present exemplary embodiment, by using the center node 10c and remote node RN-A2 as a single transit node, the center node 10a enables a remote node on its own network to share a remote key with the remote node RN-C on the different network, QKD-NW-C.

A key management server 30 monitors the respective quantum key memories 106a and 106c of the center nodes 10a and 10c. In each remote node, a generated random number sequence is stored in the quantum key memory 204. In the center node 10a, random number sequences respectively generated with the remote nodes RN-A1 to RN-AN are all stored in the quantum key memory 106a. In the center node 10c, a random number sequence generated with the remote node RN-C is stored in the quantum key memory 106c. Since each center node thus keeps track of the quantum keys of all the remote nodes connected thereto, it is sufficient for the key management server 30 to monitor the respective quantum key memories 106a and 106c of the center nodes 10a and 10c. In accordance with the remaining amounts of the quantum keys at the center nodes 10a and 10c, as described above, the key management server 30 sends an instruction to the center node 10a/10c, whereby a quantum key can be preferentially generated with an intended remote node. Quantum key generation and sharing are as described in 2.2), and therefore description thereof will be omitted here.

Note that key information is not disclosed in the communication between the key management server 30 and the center node 10c because only key management information, such as the file number and stored key amount of quantum key information, is exchanged without disclosing the quantum key itself. It is also possible that the key management information is communicated secretly by being encrypted. Moreover, the key management server 30 can prevent spoofing by authentication of the center node 10c.

4.2) Sharing of Remote Key

Figure 11:
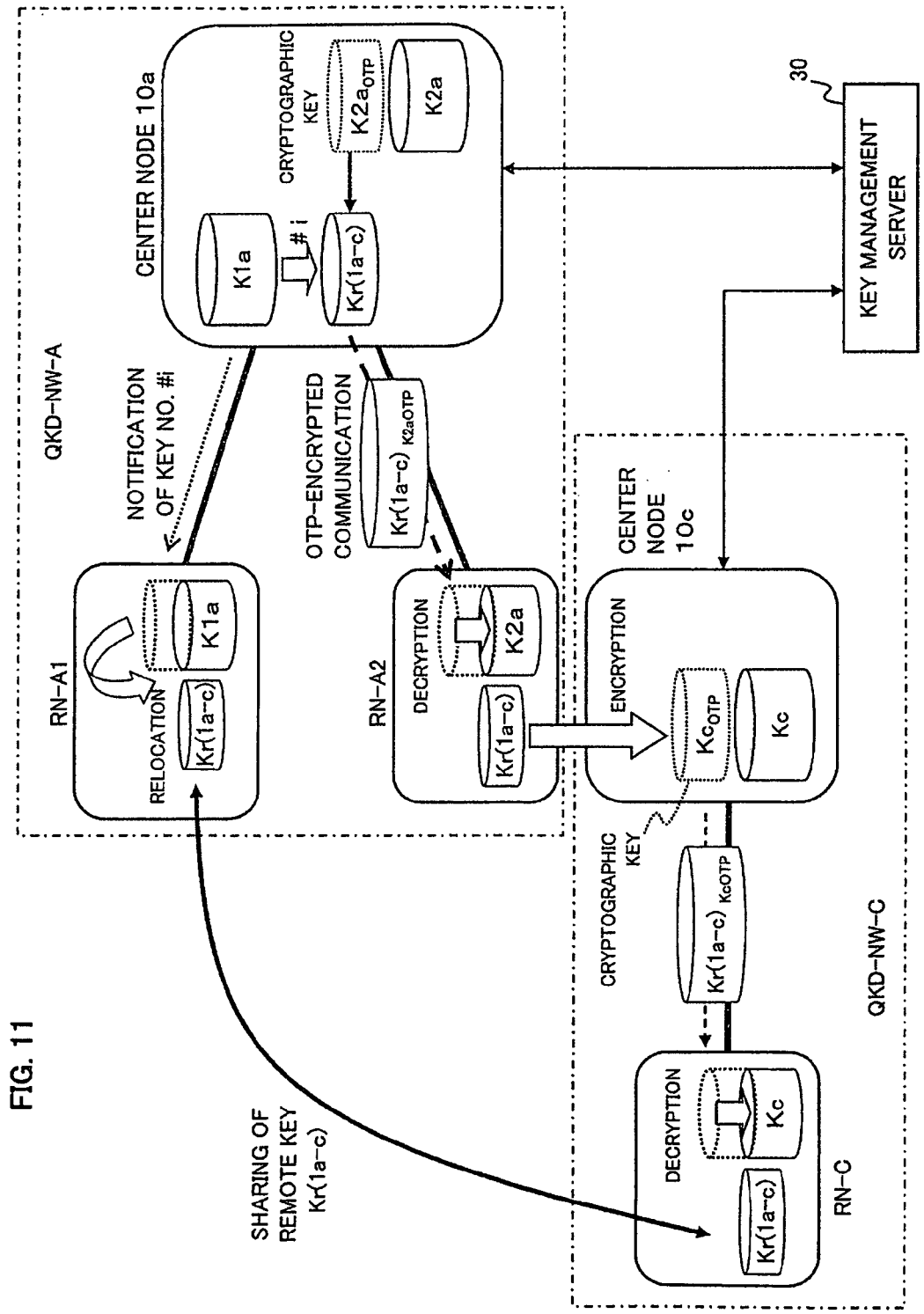
FIG. 11 is a schematic diagram to describe a procedure for sharing a remote key between remote nodes.
Figure 12:
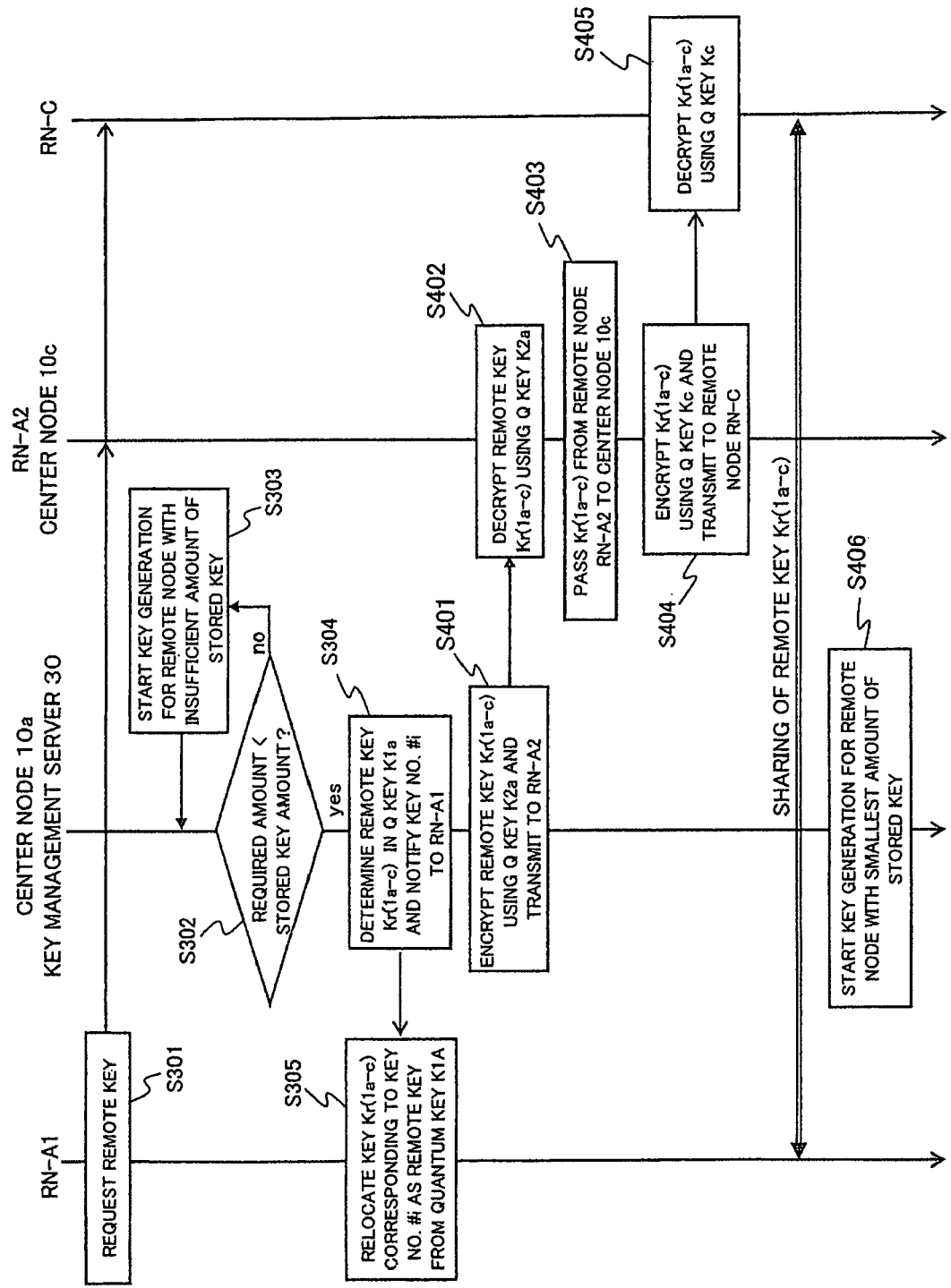
FIG. 12 is a sequence diagram showing the procedure for sharing a remote key.

FIG. 11 is a schematic diagram to describe a procedure for sharing a remote key between remote nodes, and FIG. 12 is a sequence diagram showing the procedure for sharing a remote key. Here, description will be given of a case, as an example, where a remote key Kr(1a-c) is securely shared between the remote node RN-A1 belonging to the center node 10a and the remote node RN-C belonging to the center node 10c. Note that the same steps as in FIG. 6 are denoted by the same reference symbols and numerals as in the FIG. 6, and description thereof will be simplified.

First, it is assumed that the remote node RN-A1 sends a request for a remote key to the key management server 30 through the center node 10a, in order to perform encrypted communication with the remote node RN-C (Step S301). Upon receipt of this request for a remote key, the key management server 30 checks stored key amounts (remaining amounts) with respect to all the remote nodes present along a path between the remote nodes RN-A1 and RN-C (Step S302). In the present exemplary embodiment, checked are the stored key amounts (remaining amounts) of random number sequences K1a, K2a, and Kc of the remote nodes RN-A1, RN-A2, and RN-C.

If at least one of the remaining amounts of the random number sequences K1a, K2a, and Kc is not larger than a required amount of a remote key (Step 302: NO), the key management server 30 instructs the center node 10a/10c to start a key generation process for the remote node corresponding to the insufficient stored key amount (Step S303). At this instruction, the control section 105 of the center node 10a/10c carries out the key generation process for the remote node in question. If none of the remaining amounts of the random number sequences K1a, K2a, and Kc are larger than the required amount, key generation is performed in ascending order of remaining amount, starting with the remote node corresponding to the smallest remaining amount.

If all of the remaining amounts of the random number sequences K1a, K2a, and Kc are larger than the required amount of a remote key (Step S302: YES), the key management server 30 instructs the center nodes 10a and 10c to start a remote key sharing process. First, at the instruction from the key management server 30, the center node 10a selects a part to be used as the remote key Kr(1a-c) from the random number sequence K1a and notifies the remote node RN-A1, through the classical channel, of information indicating the range corresponding to the remote key Kr(1a-c) (Step S304). The remote node RN-A1 performs processing for relocating the part corresponding to the remote key, of the quantum key (random number sequence) K1a stored in the quantum key memory 204, into the remote key memory 205 as the remote key Kr(1a-c) (Step S305). In the case where the remote node manages the random number sequence in the quantum key memory 204 in such a manner that a constant amount of the random number sequence is aggregated as a file and files are numbered in order of generation as described earlier, when the center node 10a notifies the remote node RN-A1 of the information about the remote key Kr(1a-c), it is sufficient that the center node 10a transmits only the file number through the classical channel.

Next, the center node 10a extracts a quantum key $K2a_{OTP}$ from the random number sequence K2a that has been shared with the remote node RN-A2, OTP-encrypts the remote key Kr(1a-c) by using the quantum key $K2a_{OTP}$, and transmits the OTP-encrypted remote key Kr(1a-c) to the remote node RN-2A through the classical channel (Step S401).

Upon receipt of the OTP-encrypted remote key Kr(1a-c), the remote node RN-2A extracts the same quantum key $K2a_{OTP}$ from its own random number sequence K2a and decrypts the OTP-encrypted remote key Kr(1a-c) (Step S402). Here, the range (file number) of the quantum key $K2a_{OTP}$ used for OTP encryption can also be designated by the key management server 30. The one-time pad (OTP) encryption is an encryption scheme that uses a cryptographic key equal to plain text in quantity and guarantees that cipher text is unbreakable unless the cryptographic key has periodicity. The remote key Kr(1a-c) is OTP-encrypted by using the quantum key $K2a_{OTP}$ and OTP-delivered, whereby the remote node RN-2A can securely share the remote key Kr(1a-c).

Subsequently, the remote node RN-A2 passes the remote key Kr(1a-c) to the center node 10c (Step 403). Here, encryption or the like is not particularly performed because the center nodes 10c and the remote node RN-A2 use a closed path.

Next, the center node 10c extracts a quantum key $Kc_{OTP}$ from the random number sequence Kc that is shared with the remote node RN-C, OTP-encrypts the remote key Kr(1a-c) by using the quantum key $Kc_{OTP}$, and transmits the OTP-encrypted remote key Kr(1a-c) to the remote node RN-C through the classical channel (Step S404).

The remote node RN-C extracts the same quantum key $Kc_{OTP}$ from its own random number sequence Kc, decrypts the OTP-encrypted remote key Kr(1a-c), and stores the remote key Kr(1a-c) in the remote key memory 205 (Step S405). Here, the range (file number) of the quantum key $Kc_{OTP}$ used for OTP encryption can also be designated by the key management server 30.

The one-time pad (OTP) encryption is an encryption scheme that uses a cryptographic key equal to plain text in quantity and guarantees that cipher text is unbreakable unless the cryptographic key has periodicity. The remote key Kr(1a-c) is OTP-encrypted by using the quantum key $Kc_{OTP}$ and OTP-delivered, whereby the remote node RN-C can securely share the remote key Kr(1a-c).

4.3) Replenishment of Cryptographic Key

When OTP-encrypted communication between the remote nodes occurs as described above, the random number sequence K2a shared between the center node 10a and the remote node RN-A2 and the random number sequence Kc shared between the center node 10c and the remote node RN-C are consumed. Generally, a shared random number sequence is consumed also when encrypted communication is performed through a classical channel between a center node and a remote node under jurisdiction of the center node. On the other hand, in the center node 10a, since switching of the quantum channel switch section 101 and switching of the classical channel switch section 103 can be performed independently of each other as described already, key generation through a quantum channel can also be carried out in parallel with the consumption of a shared random number sequence with each remote node. As described above, the stored key amount of each remote node repeats increasing and decreasing at all times.

Accordingly, when the OTP delivery is complete, the key management server 30 detects a random number sequence having the smallest remaining amount among the shared random number sequences stored in the respective quantum key memories 106a and 106c of the center nodes 10a and 10c, and instructs the center node 10a/10c to start a key generation process with the remote node corresponding to the smallest remaining amount (Step S406). That is, in accordance with the instruction from the key management server 30, the control section 105 of the center node 10a/10c starts the key generation process for the designated remote node. This remote node for which key generation is performed is not necessarily a remote node (here, the remote node RN-A2 or RN-C) to which OTP delivery has been performed. This is because a quantum key is consumed not only by performing OTP delivery but also by performing encrypted communication. Accordingly, it is preferable that Step S406 be executed whenever encrypted communication is performed. Note that higher priority is placed on Step S303, which is a key generation process performed when a request for a remote key is made, than on Step S406.

As described above, even if a quantum key is consumed due to OTP-encrypted communication, the key management server 30 monitors the stored key amounts at the center nodes and appropriately makes an instruction to start key generation, whereby the stored key amounts can be made uniform among the remote nodes. Thus, it is possible to provide stable OTP-encrypted communication between the center node 10a/10b and each remote node.

5. Network Example

Figure 13:
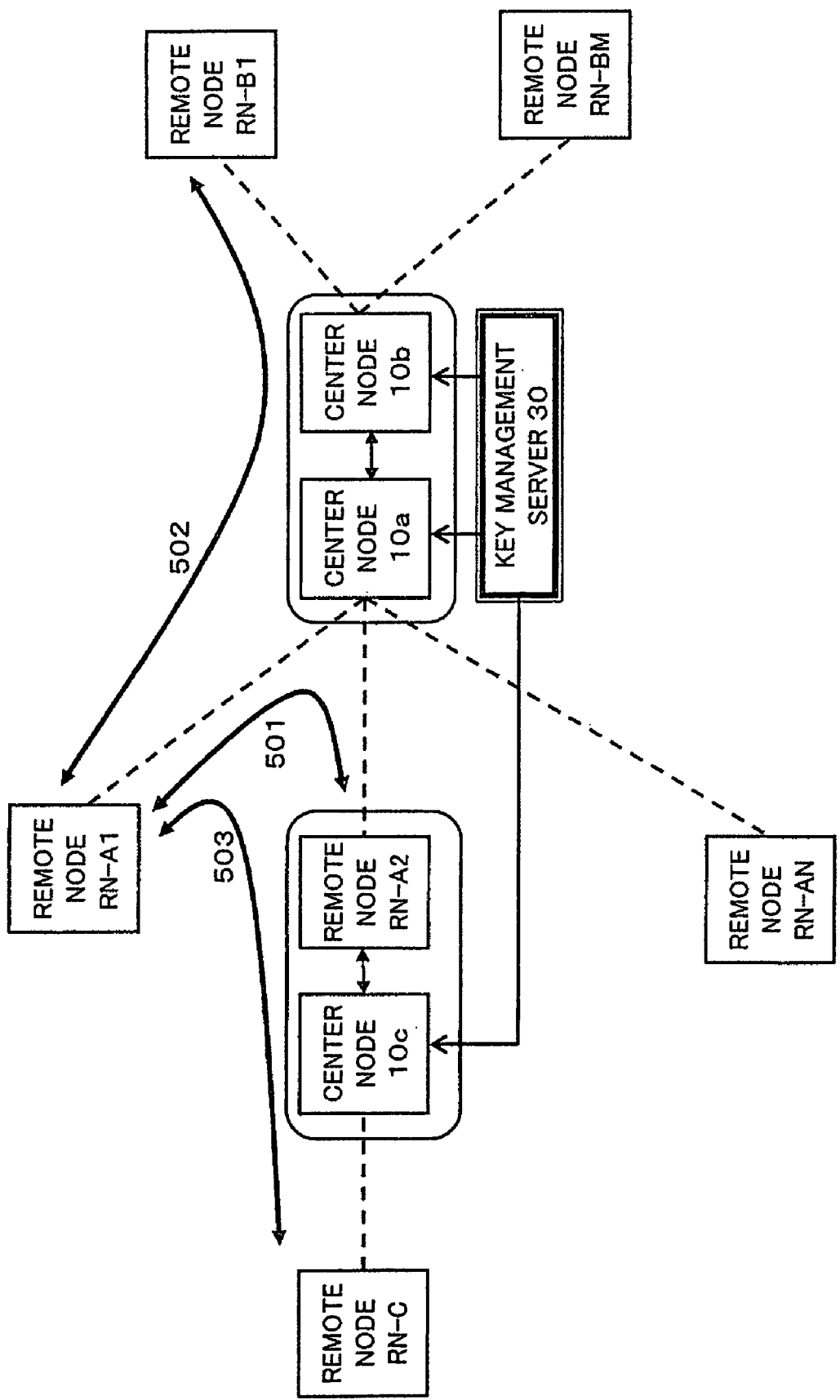
FIG. 13 is a block diagram showing another example of a secret communications network.

FIG. 13 is a block diagram showing another example of a secret communications network. Here, a center node 10a, with N remote nodes, constitutes a 1:N network, and a center node 10b, with M remote nodes, constitutes a 1:M network. Moreover, a center node 10c, with a remote node RN-C, constitutes a point-to-point network. It is assumed that each center node can generate and share a quantum cryptographic key with each remote node belonging to the center node itself. Moreover, it is assumed that the center nodes 10a and 10b are connected through a closed path, and the center node 10c and the remote node RN-A2 are also connected through a closed path, without requiring encrypted communication between each pair of nodes. A key management server 30 monitors the remaining amounts of quantum keys stored at the center nodes 10a, 10b, and 10c.

In such a network structure, remote encrypted communication 501 between the remote nodes RN-A1 and RN-A2 can be accomplished based on the above-described second exemplary embodiment, remote encrypted communication 502 between the remote nodes RN-A1 and RN-B1 can be accomplished based on the above-described third exemplary embodiment, and remote encrypted communication 503 between the remote nodes RN-A1 and RN-C can be accomplished based on the above-described fourth exemplary embodiment.

Note that the present invention is not limited to each single one of the above-described first to fourth exemplary embodiments, but can be applied to encryption management in any network structure made from a combination of these exemplary embodiments.

Moreover, the type of QKD technology may be any of plug and play types, one-way types, and differential phase-shifted types. QKD protocol is not limited to the BB84 protocol but may be any of the B92 protocol, E91 protocol, and the like. The present invention is not limited to these types and protocols.

6. Redundant Network

Furthermore, the credibility of a secret communications network can be enhanced by applying the present invention to a redundant network. For example, according to the foregoing second exemplary embodiment, the network not only enables remote nodes to share a remote key, but also can be utilized as a protection function. The dual-redundant structure of a network can be made in such a manner that, for example, the QKD-NW-A and QKD-NW-B shown in FIG. 7 are superposed on each other, with N=M, as if the diagram of FIG. 7 is folded along the broken line in the middle of the diagram, and the center node and each remote node share a remote key in each of the QKD-NW-A and QKD-NW-B similarly. Hereinafter, an example of a redundant network to which the present invention is applied will be described briefly.

Figure 14:
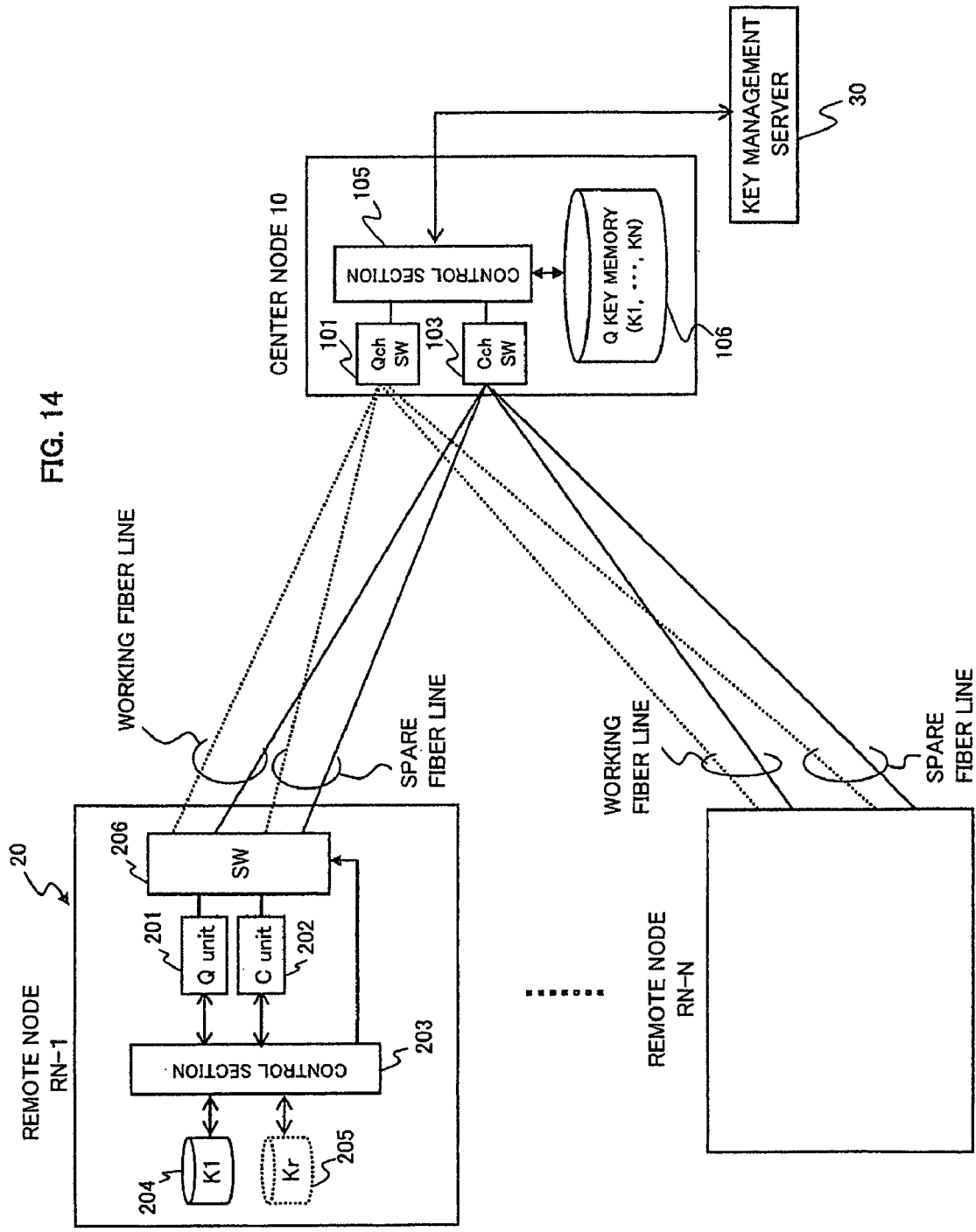
FIG. 14 is a block diagram showing the schematic structures and configurations of a center node and remote nodes in a redundant network to which the second exemplary embodiment of the present invention is applied.

FIG. 14 is a block diagram showing the schematic structures and configurations of a center node and remote nodes in a redundant network to which the second exemplary embodiment of the present invention is applied. Here, each of N (multiple) remote nodes RN-1 to RN-N is connected to a center node 10 through two lines of optical fiber (one for a working system and one for a spare (or protection) system). Normally, cryptographic key generation and sharing and encrypted communication using a cryptographic key are performed between the center node 10 and each remote node through the working fiber line. However, when a failure, or quality degradation exceeding a reference, occurs in the working system, the center node 10 and a communicating remote node change from the working system to the spare system and thus can restart or continue similar cryptographic key generation or encrypted communication. To detect a failure or quality degradation in the working system, it is sufficient to use a publicly known technique.

Each of the remote nodes RN-1 to RN-N has a switch 206 for connecting any one of the working fiber line and the spare fiber line to the quantum channel unit 201 and the classical channel unit 202. The control section 203 also performs switching control of the switch 206 to switch between the working system and the spare system, in addition to the above-described key generation control and remote-key relocation control. The quantum key memory 204 and the remote key memory 205 in this example are as described already.

The center node 10 in this example is as described already. However, in addition to the above-described controls, the control section 105 also performs control for switching between the working system and the spare system with respect to a remote node by controlling the switch sections 101 and 103. A key generation process and encrypted communication performed using the working or spare system are carried out as described in the second exemplary embodiment, and therefore description thereof will be omitted here.

The present invention is applicable to 1:N or N:M secret information communication using a shared-cryptographic-key distribution technology typified by quantum key distribution (QKD).

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for managing cryptographic keys shared between a first node and each of a plurality of second nodes connected to the first node in a network system, wherein shared cryptographic keys are generated by the first node and a corresponding second node performing a key generation process, wherein the network system has at least one network including the device for managing cryptographic keys, the first node and the second nodes, comprising:
   a monitor for monitoring amounts of cryptographic keys available for sharing between the first node and respective ones of the second nodes; and
   a key manager for selecting one of the plurality of second nodes based on the amounts of cryptographic keys stored in the respective second nodes and controlling an amount of cryptographic keys generated by the first node and a selected second node based on the amounts of cryptographic keys available to maintain the amount of cryptographic keys available.

2. The device according to claim 1, wherein the first node comprises:
   a memory for storing the cryptographic keys associated with each of the second nodes belonging to the first node, wherein the cryptographic keys have been generated with the second node; and
   a controller for switching the second nodes to generate the cryptographic keys according to an instruction of the key manager.

3. The device according to claim 1, wherein the key manager instructs the first node to start key generation with a second node which has a smallest amount of cryptographic keys among the plurality of second nodes.

4. The device according to claim 1, wherein when a request for sharing a cryptographic key between different second nodes has occurred, the key manager determines a to-be-shared cryptographic key from cryptographic keys generated at one of the different second nodes, and notifies the first node of the to-be-shared cryptographic key.

5. The device according to claim 1, wherein the network system comprises a secret communications network including at least one 1:N network composed of the first node as a center node and the second node as a remote node.

6. A key management server comprising the device according to claim 1.

7. The device according to claim 1, wherein the first node shares cryptographic keys with respective ones of the plurality of second nodes in time division manner.

8. The device according to claim 1, wherein the amount of cryptographic keys generated by the first node and the selected second node is controlled only by monitoring the amounts of cryptographic keys stored in the first node.

9. The device according to claim 1, wherein when a request for sharing a cryptographic key between different second nodes has occurred, the key manager compares a required amount of the cryptographic key with amounts of cryptographic keys on a path between the different second nodes, and instructs a first node to start key generation with a second node on the path according to a comparison result.

10. The device according to claim 9, wherein the key manager instructs a first node of a network with insufficient amount of cryptographic keys to start key generation.

11. The device according to claim 1, wherein the cryptographic keys to be shared between the first node and each of the second nodes are a random number sequence which is generated and shared by transmitting an optical pulse signal having one photon or less per pulse.

12. The device according to claim 11, wherein the optical pulse signal is transmitted from the second node to the first node, wherein the cryptographic keys to be shared are generated based on a detected optical pulse signal at the first node.

13. A method for managing cryptographic keys shared between a first node and each of a plurality of second nodes connected to the first node in a network system, wherein shared cryptographic keys are generated by the first node and a corresponding second node performing a key generation process, wherein the network system has at least one network including the first node and the second nodes, comprising:
a) monitoring amounts of cryptographic keys available for sharing between the first node and respective ones of the second nodes; and
b) selecting one of the plurality of second nodes based on the amounts of cryptographic keys stored in the respective second nodes and controlling an amount of cryptographic keys generated in the first node based on the amounts of cryptographic keys available to maintain the amount of cryptographic keys available.

14. The method according to claim 13, wherein in the b), the first node is instructed to start key generation with a second node which has a smallest amount of cryptographic keys among the plurality of second nodes.

15. The method according to claim 13, wherein the first node shares cryptographic keys with respective ones of the plurality of second nodes in time division manner.

16. The method according to claim 13, wherein the b) comprises:
when a request for sharing a cryptographic key between different second nodes has occurred, comparing a required amount of the cryptographic key with amounts of cryptographic keys on a path between the different second nodes; and
instructing a first node to start key generation with a second node on the path according to a comparison result.

17. The method according to claim 16, wherein a first node of a network with insufficient amount of cryptographic keys is instructed to start key generation.

18. The method according to claim 13, wherein the b) comprises:
when a request for sharing a cryptographic key between different second nodes has occurred, determining a to-be-shared cryptographic key from cryptographic keys generated at one of the different second nodes; and
notifying the first node of the to-be-shared cryptographic key.

19. The method according to claim 18, wherein the first node notifies the one of the different second nodes of information identifying the to-be-shared cryptographic key, and transmits the other of the different second nodes the to-be-shared cryptographic key encrypted using a cryptographic key generated with the other of the different second nodes.

20. A secret communication network comprising:
at least sub-network including a first node and a plurality of second nodes connected to the first node; and
a key management device for managing cryptographic keys available for sharing between a first node and each of the plurality of second nodes in a network system, wherein shared cryptographic keys are generated by the first node and a corresponding second node performing a key generation process, wherein the key management device comprises:
a monitor for monitoring amounts of cryptographic keys available for sharing between the first node and respective ones of the second nodes; and
a key manager for selecting one of the plurality of second nodes based on the amounts of cryptographic keys stored in the respective second nodes and controlling an amount of cryptographic keys generated by the first node and a selected second node based on the amounts of cryptographic keys available to maintain the amount of cryptographic keys available.

21. The secret communication network according to claim 20, wherein the first node comprises:
a memory for storing the cryptographic keys associated with each of the second nodes belonging to the first node, wherein the cryptographic keys have been generated with the second node; and
a controller for switching the second nodes to generate the cryptographic keys according to an instruction of the key manager.

22. The secret communication network according to claim 20, wherein when a request for sharing a cryptographic key between different second nodes has occurred, the key manager determines a to-be-shared cryptographic key from cryptographic keys generated at one of the different second nodes, and notifies the first node of the to-be-shared cryptographic key.

23. The secret communication network according to claim 20, wherein a plurality of sub-networks each include a first node and a plurality of second nodes connected to the first node, wherein first nodes of the plurality of sub-networks are connected by a closed path to function as a single first node in the plurality of sub-networks.

24. The secret communication network according to claim 20, wherein a plurality of sub-networks each include a first node and a plurality of second nodes connected to the first node, wherein a first node of one sub-network is connected to a second node of another sub-network by a closed path.

25. The secret communication network according to claim 20, wherein the first node is connected to another second node via a transit node connected to one of the second nodes by a close path.

26. The secret communication network according to claim 20, wherein the first node shares cryptographic keys with respective ones of the plurality of second nodes in time division manner.

27. The secret communication network according to claim 20, wherein when a request for sharing a cryptographic key between different second nodes has occurred, the key manager compares a required amount of the cryptographic key with amounts of cryptographic keys on a path between the different second nodes, and instructs a first node to start key generation with a second node on the path according to a comparison result.

28. The secret communication network according to claim 27, wherein the key manager instructs a first node of a network with insufficient amount of cryptographic keys to start key generation.

29. The secret communication network according to claim 20, wherein the cryptographic keys to be shared between the first node and each of the second nodes are a random number sequence which is generated and shared by transmitting an optical pulse signal having one photon or less per pulse.

30. The secret communication network according to claim 29, wherein the optical pulse signal is transmitted from the second node to the first node, wherein the cryptographic keys to be shared are generated based on a detected optical pulse signal at the first node.

31. A computer-readable storage device embodying a program executable by a computer causing the computer to operate as a cryptographic key manager which manages cryptographic keys shared between a first node and each of a plurality of second nodes connected to the first node in a network system, wherein shared cryptographic keys are generated by the first node and a corresponding second node performing a key generation process, wherein the network system has at least one network including the cryptographic key manager, the first node and the second nodes, wherein the cryptographic key manager comprises:
 a monitor for monitoring amounts of cryptographic keys available for sharing between the first node and respective ones of the second nodes; and
 a key manager for selecting one of the plurality of second nodes based on the amounts of cryptographic keys stored in the respective second nodes and controlling an amount of cryptographic keys generated in the first node based on the amounts of cryptographic keys available to maintain the amount of cryptographic keys available.

32. The program according to claim 31, wherein the first node shares cryptographic keys with respective ones of the plurality of second nodes in time division manner.

33. A center node connected to a plurality of remote nodes, comprising:
 a memory for storing the cryptographic keys associated with each of the remote nodes, wherein the cryptographic keys have been generated with the remote node by performing a key generation process; and
 a controller for generating cryptographic keys with one selected from the remote nodes based on an available amount of cryptographic keys associated with a selected remote node to maintain the amount of cryptographic keys available.

34. The center node according to claim 33, wherein the controller controls an available amount of cryptographic keys with a remote node selected according to a key generation instruction from a key management server.

35. The center node according to claim 33, further comprising:
 a monitor for monitoring amounts of cryptographic keys generated with respective ones of the remote nodes; and
 a key manager for controlling an amount of cryptographic keys generated in the center node based on the amounts of cryptographic keys available to maintain the amount of cryptographic keys available.

36. The center node according to claim 33, wherein the center node shares cryptographic keys with respective ones of the plurality of remote nodes in time division manner.

* * * * *